United States Patent
Goodnight et al.

(10) Patent No.: US 7,640,284 B1
(45) Date of Patent: Dec. 29, 2009

(54) BIT REVERSAL METHODS FOR A PARALLEL PROCESSOR

(75) Inventors: Nolan D. Goodnight, Sunnyvale, CA (US); John R. Nickolls, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 785 days.

(21) Appl. No.: 11/424,514

(22) Filed: Jun. 15, 2006

(51) Int. Cl.
 *G06F 17/14* (2006.01)
(52) U.S. Cl. ...................................... 708/404
(58) Field of Classification Search ........................ None
 See application file for complete search history.

(56) References Cited

U.S. PATENT DOCUMENTS

| | | | |
|---|---|---|---|
| 5,778,416 A | 7/1998 | Harrison et al. | |
| 5,854,758 A | 12/1998 | Kosuda et al. | |
| 6,088,714 A | 7/2000 | Wadleigh | |
| 6,366,998 B1 | 4/2002 | Mohamed | |
| 6,532,484 B1 | 3/2003 | Kechriotis | |
| 6,897,891 B2 | 5/2005 | Morein et al. | |
| 7,047,268 B2 * | 5/2006 | Harley et al. | 708/404 |
| 7,062,523 B1 * | 6/2006 | Hoffman et al. | 708/404 |
| 7,584,342 B1 | 9/2009 | Nordquist et al. | |
| 2005/0160127 A1 * | 7/2005 | Swartzlander et al. | 708/404 |
| 2005/0198092 A1 | 9/2005 | Shen et al. | |
| 2005/0256917 A1 * | 11/2005 | Harley | 708/404 |
| 2006/0256782 A1 | 11/2006 | Shimizu | |
| 2007/0208795 A1 | 9/2007 | Nakanishi | |
| 2007/0239815 A1 | 10/2007 | Cousineau et al. | |
| 2008/0184211 A1 | 7/2008 | Nickolls et al. | |

OTHER PUBLICATIONS

U.S. Appl. No. 11/424,511, Office Action dated Oct. 16, 2009, 7 pages.

* cited by examiner

*Primary Examiner*—David H Malzahn
(74) *Attorney, Agent, or Firm*—Townsend and Townsend and Crew LLP

(57) ABSTRACT

Parallelism in a processor is exploited to permute a data set based on bit reversal of indices associated with data points in the data set. Permuted data can be stored in a memory having entries arranged in banks, where entries in different banks can be accessed in parallel. A destination location in the memory for a particular data point from the data set is determined based on the bit-reversed index associated with that data point. The bit-reversed index can be further modified so that at least some of the destination locations determined by different parallel processes are in different banks, allowing multiple points of the bit-reversed data set to be written in parallel.

17 Claims, 11 Drawing Sheets

| B0 | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|
| d0 | d1 | d2 | d3 | d4 | d5 | d6 | d7 | d8 | d9 | d10 | d11 | d12 | d13 | d14 | d15 |
| d16 | d17 | d18 | d19 | d20 | d21 | d22 | d23 | d24 | d25 | d26 | d27 | d28 | d29 | d30 | d31 |
| d32 | d33 | d34 | d35 | d36 | d37 | d38 | d39 | d40 | d41 | d42 | ... |  |  |  |  |
|  |  |  |  |  |  |  |  |  |  |  |  |  |  |  |  |
|  |  |  |  |  |  |  |  |  |  |  |  |  |  |  |  |

*FIG. 9A*

| B0 | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|
| d0 | d1 | d2 | d3 | d4 | d5 | d6 | d7 | d8 | d9 | d10 | d11 | d12 | d13 | d14 | d15 |
| ✕ | d16 | d17 | d18 | d19 | d20 | d21 | d22 | d23 | d24 | d25 | d26 | d27 | d28 | d29 | d30 |
| d31 | ✕ | d32 | d33 | d34 | d35 | d36 | d37 | d38 | d39 | d40 | d41 | d42 | ... |  |  |
|  |  | ✕ |  |  |  |  |  |  |  |  |  |  |  |  |  |
|  |  |  | ✕ |  |  |  |  |  |  |  |  |  |  |  |  |

*FIG. 9B*

BIT REVERSAL METHODS FOR A PARALLEL PROCESSOR

CROSS-REFERENCES TO RELATED APPLICATIONS

The present disclosure is related to commonly-assigned co-pending U.S. patent application Ser. No. 11/305,178, filed Dec. 15, 2005, entitled "Parallel Data Processing Systems and Methods Using Cooperative Thread Arrays" and to commonly-assigned co-pending U.S. patent application Ser. No. 11/424,511, filed of even date herewith, entitled "Fast Fourier Transforms and Related Transforms Using Cooperative Thread Arrays." The respective disclosures of these applications are incorporated herein by reference for all purposes.

BACKGROUND OF THE INVENTION

The present invention relates in general to parallel processors and in particular to techniques for permuting data sets based on bit reversal of indices associated with data points in the data set, which techniques may be used, e.g., in connection with Fast Fourier Transform algorithms.

The Fourier Transform can be used to map a time domain signal to its frequency domain counterpart. Conversely, an Inverse Fourier Transform can be used to map a frequency domain signal to its time domain counterpart. Fourier transforms are commonly used for spectral analysis of time domain signals, for modulating signal streams in communication systems, and for numerous other applications.

Systems that process sampled data (e.g., conventional digital signal processors) generally implement a Discrete Fourier Transform (DFT) in which a processor performs the transform on a predetermined number of discrete samples. However, the DFT is computationally intensive; the number of computations required to perform an N-point DFT is $O(N^2)$. In some processors, the amount of processing power dedicated to performing DFTs may limit the processor's ability to perform other operations. Additionally, systems that are configured to operate in real time may not have sufficient processing power to perform a large DFT within a time allocated for the computation; the limited number of samples can adversely affect quality of the resulting signals.

The Fast Fourier Transform (FFT) is an implementation of the DFT that allows a DFT to be performed in significantly fewer operations. For example, the radix-2 FFT algorithm recursively breaks down an N-point FFT into two N/2-point FFTs until the computation is reduced to N/2 2-point FFTs. For a decimation-in-time algorithm, each 2-point FFT is computed using an FFT "butterfly" computation of the form:

$$a_{i1}' = a_{i1} + a_{i2} e^{-j2\pi k/N}$$

$$a_{i2}' = a_{i1} - a_{i2} e^{-j2\pi k/N} \quad \text{(Eq. 1)},$$

where $a_{i1}$ and $a_{i2}$ are two points in the initial data set, k is in the range 0 to N−1 (with the value of k depending on $i_1$ and $i_2$), and $j = \sqrt{-1}$. Computed values $a'_{i1}$ and $a'_{i2}$ replace the original values $a_{i1}$ and $a_{i2}$ in the data set. The computation proceeds in stages (also referred to herein as "levels"), with pairs of output points $a'_{i1}$, $a'_{i2}$ generated in one stage being used as input points for the next stage. At each stage, or level, pairs of points are "butterflied" using Eq. 1. In one implementation, indices $i_1$ and $i_2$ identifying pairs of points for each butterfly are separated from each other by a "stride" of $2^L$, where L is a level index that increments from 0 to $\log_2 N-1$. This algorithm requires $O(N \log_2 N)$ computations to complete.

As is known in the art, some FFT algorithms produce output data points out of the "natural" sequence. For instance, when transforming from time domain to frequency domain using a forward DFT, it is expected that if the input samples are provided in temporal order, the output spectral samples should be in order of ascending frequency; for transforming from frequency domain to time domain (the inverse DFT), the converse is expected. Some FFT algorithms, however, generate the output points in a permuted sequence in which the indices are "bit-reversed," i.e., the index of an output data point, expressed as a binary number, is a mirror image of the index bits for the output data point in the natural sequence.

Accordingly, some FFT implementations perform bit-reversal, permuting the data points such that the output data is presented in its natural sequence. In some decimation-in-time implementations, the data set is permuted prior to the first set of butterfly computations by bit-reversing each index. The output data is then in the natural sequence. In other decimation-in-frequency implementations, the output data set is permuted by bit-reversing each index after the last set of butterfly computations.

Conventional FFT implementations on processors such as digital signal processors (DSPs), central processing units (CPUs), and parallel processing systems rely heavily on a hardware-managed cache hierarchy to store the intermediate result data. These implementations require multiple accesses to an off-chip memory, which may increase memory bandwidth requirements or slow throughput.

It would therefore be desirable to provide faster implementations of FFT algorithms, including bit-reversal algorithms.

BRIEF SUMMARY OF THE INVENTION

Embodiments of the present invention provide techniques that exploit parallelism in a processor to efficiently permute a data set based on bit reversal of indices associated with data points in the data set. In some embodiments, permuted data is to be stored in a memory having entries arranged in banks, where entries in different banks can be accessed in parallel. A destination location in the memory for a particular data point from the data set is determined based on the bit-reversed index associated with that data point; for purposes of this determination, a bit-reversed index can be further modified so that at least some of the destination locations determined by different parallel processes (e.g., by parallel threads executed in single instruction, multiple data (SIMD) fashion) are in different banks, allowing multiple points of the bit-reversed data set to be written in parallel. In some embodiments, multiple indices may be bit-reversed in parallel, e.g., by parallel threads executed in SIMD fashion, using a small lookup table that supports multiple parallel accesses.

According to one aspect of the present invention, a method for transferring a data set having a plurality of data points from a first memory to a second memory includes providing a data set in a first memory, the data set including a number of data points, each data point having a unique index associated therewith. A second memory is identified. The second memory has multiple banks, each bank has multiple locations, and locations in different banks are accessible in parallel. At least two of the data points of the data set are read from the first memory. The respective indices associated with each of the at least two data points are bit-reversed to obtain at least two bit-reversed indices. The bit-reversed indices for the at least two data points correspond to destination locations in the same bank in the second memory. The bit-reversed indices are further modified such that the respective destination locations corresponding to different ones of the at least two modified bit-reversed indices are in different ones of the banks. For example, the bit-reversed indices may be modified by computing a skew amount based on the bit-reversed index and the number of banks in the second memory and adding the skew amount to the bit-reversed index; the skew amount might be, e.g., the bit-reversed index divided by the number of banks. The at least two data points are then written, in parallel, to the second memory at respective destination locations corresponding to the modified bit-reversed indices. These actions can be repeated until the entire data set is stored in the second memory.

In some embodiments, during the act of reading, the at least two data points are read in parallel; during the act of bit-reversing, the indices associated with the at least two data points are bit-reversed in parallel; and during the act of modifying, the at least two bit-reversed indices are modified in parallel. The act of bit-reversing can be performed during a latency period associated with the act of reading.

In some embodiments, the second memory is a shared memory area accessible only to threads in a thread array that is configured to process the data set. For instance, the thread array may perform a Fast Fourier Transform (FFT) or other transformation on the data set after the entire data set has been transferred into the second memory.

In some embodiments, bit-reversing each of the at least two indices is performed using a lookup table that has a number of entries that is less than a number of data points in the data set. Each entry in the lookup table associates a bit segment having a number b of bits with a bit-reversed counterpart of the b-bit segment. From each index that is to be bit-reversed, a first b-bit segment consisting of the b least significant bits of the index is extracted. A lookup operation that uses the first b-bit segment and returns a corresponding first bit-reversed segment is performed on the lookup table; lookup operations are advantageously performed for respective first segments of two or more indices in parallel. A second b-bit segment can also be extracted from the index, and a further lookup operation that uses the second b-bit segment and returns a corresponding second bit-reversed segment can be performed; again, lookup operations are advantageously performed for respective second segments of two or more indices in parallel. The second bit-reversed segment is appended to the corresponding first bit-reversed segment.

According to another aspect of the present invention, a method for transferring an input data set from a first memory to a second memory includes defining a thread array having multiple threads, where each thread is configured to execute a same program on an input data set to produce an output data set and where each thread has a unique thread identifier assigned thereto. The threads of the thread array are grouped into one or more thread groups, wherein threads in each thread group are to be executed in parallel. A second memory is identified. The second memory has multiple banks, with each bank having multiple locations; locations in different banks are accessible in parallel. The threads of each thread group are executed in parallel. During execution, for each thread in the thread group, an index identifying a data point of the input data set is determined, based at least in part on the unique thread identifier. The identified data point is from the first memory. The index is bit-reversed. For certain memory configurations, respective bit-reversed indices computed for a first thread and a second thread of the thread group correspond to different locations in the same bank in the second memory. To avoid such "bank conflicts," the bit-reversed index is advantageously modified such that the respective modified bit reversed indices for the first thread and the second thread correspond to locations in different ones of the banks. The data point that was read from the first memory is written to the second memory at a location corresponding to the modified bit-reversed index. Respective data points read by the first thread and the second thread are written in parallel.

In some embodiments, the input data set is to be transformed using a Fast Fourier Transform (FFT). Where this is the case, during execution of the threads in each thread group, each thread in the thread group may read at least two data points from the second memory, with the at least two data points being selected based in part on the thread identifier assigned to the thread. The thread performs a butterfly calculation on the at least two data points to produce at least two modified data points and writes the at least two modified data points to the second memory, e.g., overwriting the at least two data points that were read during the act of reading.

The following detailed description together with the accompanying drawings will provide a better understanding of the nature and advantages of the present invention.

BRIEF DESCRIPTION OF THE DRAWINGS

FIGS. 9A-9B illustrate an implementation of a shared memory according to an embodiment of the present invention.

DETAILED DESCRIPTION OF THE INVENTION

Embodiments of the present invention provide techniques that exploit parallelism in a processor to efficiently permute a data set based on bit reversal of indices associated with data points in the data set. In some embodiments, permuted data is to be stored in a memory having entries arranged in multiple banks, where entries can be accessed in parallel if they are in different banks. A destination location in the memory for a particular data point from the data set is determined based on the bit-reversed index associated with that data point; the bit-reversed index is modified so that at least some of the destination locations determined by different parallel processes (e.g., parallel threads executed in single instruction, multiple data (SIMD) fashion) are in different banks. In some embodiments, multiple indices may be bit-reversed in parallel, e.g., by parallel threads executed in SIMD fashion, using a small lookup table that supports multiple parallel accesses.

System Overview

Figure 1:
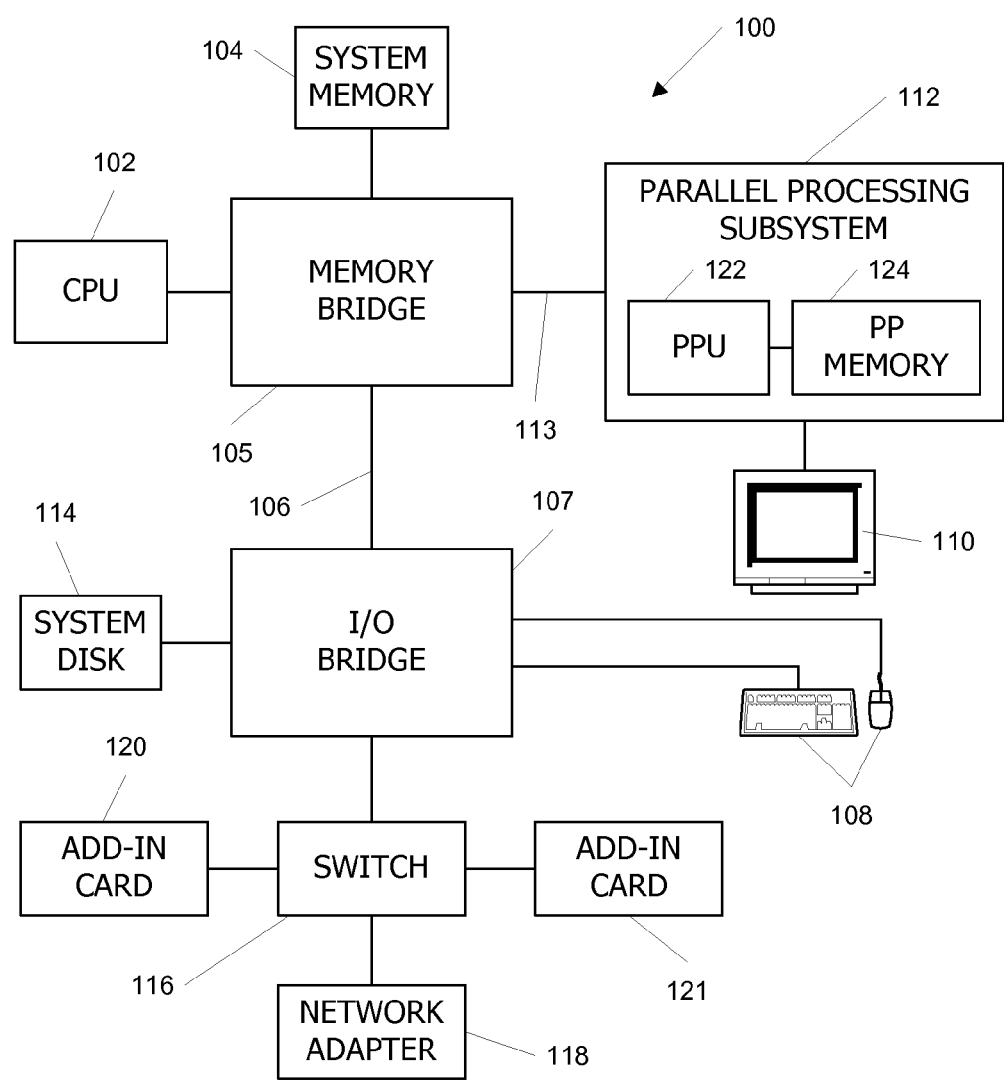
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to I/O bridge 107 via a bus or other communication path 113 (e.g., a PCI Express or Accelerated Graphics Port link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), Hypertransport, or any other bus or point-to-point communication protocol(s), and connections between different devices may use different protocols as is known in the art.

Parallel processing subsystem 112 includes a parallel processing unit (PPU) 122 and a parallel processing (PP) memory 124, which may be implemented, e.g., using one or more integrated circuit devices such as programmable processors, application specific integrated circuits (ASICs), and memory devices. PPU 122 advantageously implements a highly parallel processor including one or more processing cores, each of which is capable of executing a large number (e.g., hundreds or thousands) of threads concurrently. PPU 122 can be programmed to perform a wide array of computations, including data transforms such as FFTs. PPU 122 may transfer data from system memory 104 and/or PP memory 124 into internal memory, process the data, and write result data back to system memory 104 and/or PP memory 124, where such data can be accessed by other system components, including, e.g., CPU 102. In some embodiments, PPU 122 is a graphics processor that can also be configured to perform various tasks related to generating pixel data from graphics data supplied by CPU 102 and/or system memory 104 via memory bridge 105 and bus 113, interacting with PP memory 124 (which can be used as graphics memory including, e.g., a conventional frame buffer) to store and update pixel data, delivering pixel data to display device 110, and the like. In some embodiments, PP subsystem 112 may include one PPU 122 operating as a graphics processor and another PPU 122 used for general-purpose computations, and the PPUs may be identical or different, and each PPU may have its own dedicated PP memory device(s).

CPU 102 operates as the master processor of system 100, controlling and coordinating operations of other system components. In particular, CPU 102 issues commands that control the operation of PPU 122. In some embodiments, CPU 102 writes a stream of commands for PPU 122 to a command buffer, which may be in system memory 104, PP memory 124, or another storage location accessible to both CPU 102 and PPU 122. PPU 122 reads the command stream from the command buffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 122 to the rest of system 100 may also be varied. In some embodiments, PP system 112 is implemented as an add-in card that can be inserted into an expansion slot of system 100. In other embodiments, a PPU can be integrated on a single chip with a bus bridge, such as memory bridge 105 or I/O bridge 107.

A PPU may be provided with any amount of local PP memory, including no local memory, and may use local memory and system memory in any combination. For instance, PPU 122 can be a graphics processor in a unified memory architecture (UMA) embodiment; in such embodiments, little or no dedicated graphics memory is provided, and PPU 122 would use system memory exclusively or almost exclusively. In UMA embodiments, the PPU may be integrated into a bridge chip or provided as a discrete chip with a high-speed link (e.g., PCI-E) connecting the GPU to the bridge chip and system memory.

It is also to be understood that any number of PPUs may be included in a system, e.g., by including multiple PPUs on a single add-in card or by connecting multiple graphics cards to path 113. Multiple PPUs may be operated in parallel to process data at higher throughput than is possible with a single PPU.

Systems incorporating PPUs may be implemented in a variety of configurations and form factors, including desktop, laptop, or handheld personal computers, servers, workstations, and so on.

Core Architecture

Figure 2:
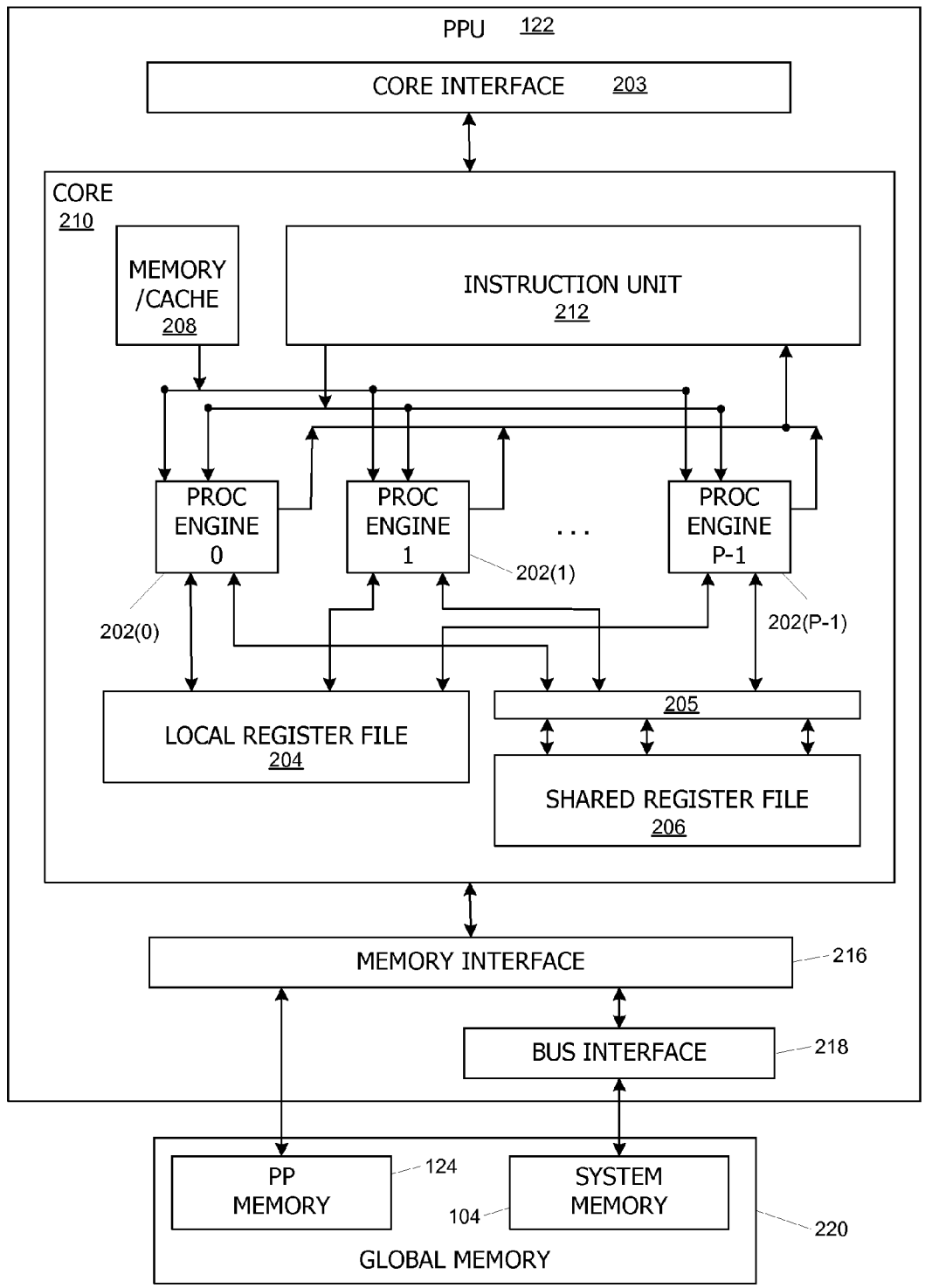
FIG. 2 is a block diagram of a parallel processor including a processing core usable in an embodiment of the present invention.

FIG. 2 is a block diagram of a PPU 122 usable in an embodiment of the present invention. PPU 122 includes a core 210 configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction fetch units.

In one embodiment, core 210 includes an array of P (e.g., 16) parallel processing engines 202 configured to receive SIMD instructions from a single instruction unit 212. Each processing engine 202 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 202 uses space in a local register file 204 for storing its local input data, intermediate results, and the like. In one embodiment, local register file 204 is physically or logically divided into P lanes, each having some number of entries (where each entry might be, e.g., a 32-bit word). One lane is assigned to each processing unit, and corresponding entries in different lanes can be populated with data for different threads executing the same program to facilitate SIMD execution. The number of entries in local register file 204 is advantageously large enough to support multiple concurrent threads per processing engine 202.

Each processing engine 202 also has access, via a crossbar switch 205, to a shared register file 206 that is shared among all of the processing engines 202 in core 210. Shared register file 206 may be as large as desired, and in some embodiments, any processing engine 202 can read to or write from any location in shared register file 206. Shared register file 206 advantageously provides a shared memory with low latency. In addition to shared register file 206, some embodiments also provide additional on-chip shared memory and/or cache(s) 208, which may be implemented, e.g., as a conventional RAM or cache. On-chip memory 208 is advantageously used to hold data needed by multiple threads. Processing engines 202 also have access via a memory interface 216 to additional off-chip global memory 220, which includes, e.g., PP memory 124 and/or system memory 104, with system memory 104 being accessible by memory interface 216 via a bus interface 218; it is to be understood that any memory external to PPU 122 may be used as global memory 220. Memory interface 216 and bus interface 218 may be of generally conventional design, and other appropriate interfaces may be substituted. Processing engines 202 are advantageously coupled to memory interface 216 via an interconnect (not explicitly shown) that allows any processing engine 202 to access global memory 220.

In one embodiment, each processing engine 202 is multithreaded and can execute up to some number G (e.g., 24) of threads concurrently, e.g., by maintaining current state information associated with each thread in a different portion of its assigned lane in local register file 204. Processing engines 202 are advantageously designed to switch rapidly from one thread to another so that instructions from different threads can be issued in any sequence without loss of efficiency.

Instruction unit 212 is configured such that, for any given processing cycle, the same instruction (INSTR) is issued to all P processing engines 202. Thus, at the level of a single clock cycle, core 210 implements a P-way SIMD microarchitecture. Since each processing engine 202 is also multithreaded, supporting up to G threads, core 210 in this embodiment can have up to P*G threads executing concurrently. For instance, if P=16 and G=24, then core 210 supports up to 384 concurrent threads.

Because instruction unit 212 issues the same instruction to all P processing engines 202 in parallel, core 210 is advantageously used to process threads in "SIMD groups." As used herein, a "SIMD group" refers to a group of up to P threads of execution of the same program on different input data, with one thread of the group being assigned to each processing engine 202. (A SIMD group may include fewer than P threads, in which case some of processing engines 202 will be idle during cycles when that SIMD group is being processed.) Since each processing engine 202 can support up to G threads, it follows that up to G SIMD groups can be executing in core 210 at any given time.

On each clock cycle, one instruction is issued to all P threads making up a selected one of the G SIMD groups. To indicate which thread is currently active, a "group index" (GID) for the associated thread may be included with the instruction. Processing engine 202 uses group index GID as a context identifier, e.g., to determine which portion of its assigned lane in local register file 204 should be used when executing the instruction. Thus, in a given cycle, all processing engines 202 in core 210 are nominally executing the same instruction for different threads in the same group. (In some instances, some threads in a group may be temporarily idle, e.g., due to conditional or predicated instructions, divergence at branches in the program, or the like.)

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 210 is shown, a PPU 122 may include any number of cores 210, with appropriate work distribution logic to distribute incoming processing tasks among the available cores 210, further increasing the processing capacity.

Cooperative Thread Arrays (CTAs)

In accordance with an embodiment of the present invention, multithreaded processing core 210 of FIG. 2 can execute general-purpose computations using cooperative thread arrays (CTAs). As used herein, a "CTA" is a group of multiple threads that concurrently execute the same program on an input data set to produce an output data set. Each thread in the CTA is assigned a unique thread identifier ("thread ID") that is accessible to the thread during its execution. The thread ID controls various aspects of the thread's processing behavior. For instance, a thread ID may be used to determine which portion of the input data set a thread is to process, to identify one or more other threads with which a given thread is to share an intermediate result, and/or to determine which portion of an output data set a thread is to produce or write.

CTAs are advantageously employed to perform computations such as FFTs that lend themselves to a data parallel decomposition, i.e., application of the same processing algorithm to different portions of an input data set in order to effect a transformation of the input data set to an output data set. The processing algorithm is specified in a "CTA program," and each thread in a CTA executes the same CTA program on a different subset of an input data set. A CTA program can implement algorithms using a wide range of mathematical and logical operations, and the program can include conditional or branching execution paths and direct and/or indirect memory access. Examples of CTA programs usable for FFT computations are described below.

Threads in a CTA can share intermediate results with other threads in the same CTA using a shared memory (e.g., shared register file 206) that is accessible to all of the threads, an interconnection network, or other technologies for interthread communication, including technologies known in the art. In some embodiments, a CTA program includes an instruction to compute an address in shared memory to which particular data is to be written, with the address being a function of thread ID. Each thread computes the function using its own thread ID and writes to the corresponding location. The address function is advantageously defined such that different threads write to different locations; as long as the function is deterministic, the location written to by any thread is well-defined. The CTA program can also include an instruction to compute an address in shared memory from which data is to be read, with the address being a function of thread ID. By defining suitable functions and providing synchronization techniques, data can be written to a given location by one thread and read from that location by a different thread in a predictable manner. Consequently, any desired pattern of data sharing among threads can be supported, and any thread in a CTA can share data with any other thread in the same CTA.

Since all threads in a CTA execute the same program, any thread can be assigned any thread ID, as long as each valid thread ID is assigned to only one thread. In one embodiment, thread IDs are assigned sequentially to threads as they are launched, as described in above-referenced application Ser. No. 11/305,178. It should be noted that as long as data sharing is controlled by reference to thread IDs, the particular assignment of threads to processing engines will not affect the result of the CTA execution. Thus, a CTA program can be independent of the particular hardware on which it is to be executed.

Any unique identifier (including but not limited to numeric identifiers) can be used as a thread ID. In one embodiment, if a CTA includes some number (T) of threads, thread IDs are simply sequential (one-dimensional) index values from 0 to T−1. In other embodiments, multidimensional indexing schemes can be used.

In addition to thread IDs, some embodiments also provide a CTA identifier that is common to all threads in the CTA. CTA identifiers can be helpful, e.g., where an input data set is to be processed using multiple CTAs that process different (possibly overlapping) portions of an input data set; examples of using multiple CTAs to perform FFTs are described below. The CTA identifier may be stored in a local register of each thread, in a state register accessible to all threads of the CTA, or in other storage accessible to the threads of the CTA.

While all threads within a CTA are executed concurrently, there is no requirement that different CTAs are executed concurrently, and the hardware need not support sharing of data between threads in different CTAs.

It will be appreciated that the size (number of threads) of a CTA and number of CTAs required for a particular application will depend on the application. Thus, the size of a CTA, as well as the number of CTAs to be executed, are advantageously defined by a programmer or driver program and provided to core 210 and core interface 203 as state parameters.

CTAs are described in further deta$_{i1}$ in above-referenced application Ser. No. 11/305,178.

FFT Using a Single CTA

In accordance with an embodiment of the present invention, FFT algorithms are advantageously implemented using CTAs. For a radix-2 FFT, each thread reads two data points (selected based on thread ID and a current transform level) from the input data set, then performs a butterfly computation (two multiplications and two additions) to arrive at a pair of intermediate points. The intermediate points are written back to shared memory (e.g., shared register file 206) so that they can be shared with other threads in the CTA. After each butterfly computation, the CTA threads synchronize and wait for other threads' intermediate values to be written before reading those intermediate values.

Figure 3:
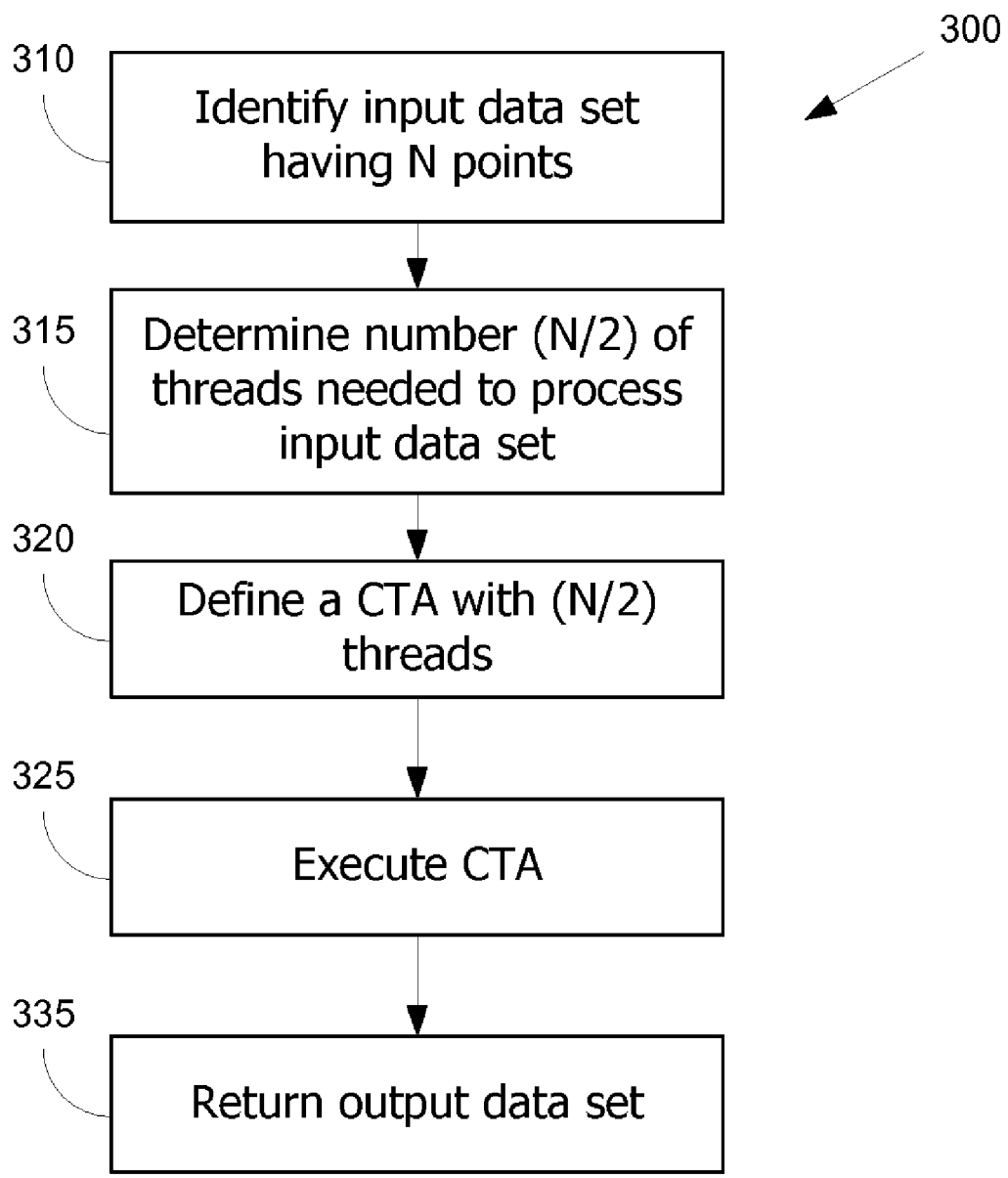
FIG. 3 is a flow diagram of a process for performing a radix-2 FFT on an input data set using a cooperative thread array (CTA) according to an embodiment of the present invention.

FIG. 3 is a flow diagram of a process 300 for performing a radix-2 FFT on an input data set using one CTA according to an embodiment of the present invention. Process 300 can be implemented, e.g., in a driver program for PPU 122 that executes on CPU 102 of FIG. 1. At step 310 of process 300, an N-point input data set is identified. In one embodiment, an application program executing on CPU 102 that invokes driver process 300 provides a pointer or other reference to a specific array in global memory 220 (e.g., in system memory 104 or PP memory 124), that stores the input data set. After the input data set is identified, the number of threads needed to process the input data set is determined (step 315). In one embodiment, the number of threads is N/2.

At step 320, a CTA with N/2 threads is defined. At step 325, the CTA is executed, e.g., by core 210 of PPU 122. Process 300 advantageously waits while the CTA executes. As described below, upon completion, the CTA writes an output data set to an array in global memory 220. After CTA execution is completed, process 300 returns the output data set, e.g., by returning a pointer to the array in global memory 220 that holds the output data set (step 335). In some embodiments, the input array may be used as the output array, with output data overwriting input data. In other embodiments, the input and output data may be stored in different arrays.

It will be appreciated that process 300 described herein is illustrative and that variations and modifications are possible. Steps described as sequential may be executed in parallel, order of steps may be varied, and steps may be modified or combined. In some embodiments, a CPU 102 that performs process 300 may proceed with other tasks while process 300 is waiting for the CTA to execute.

CTA Program for FFT

Figure 4A:
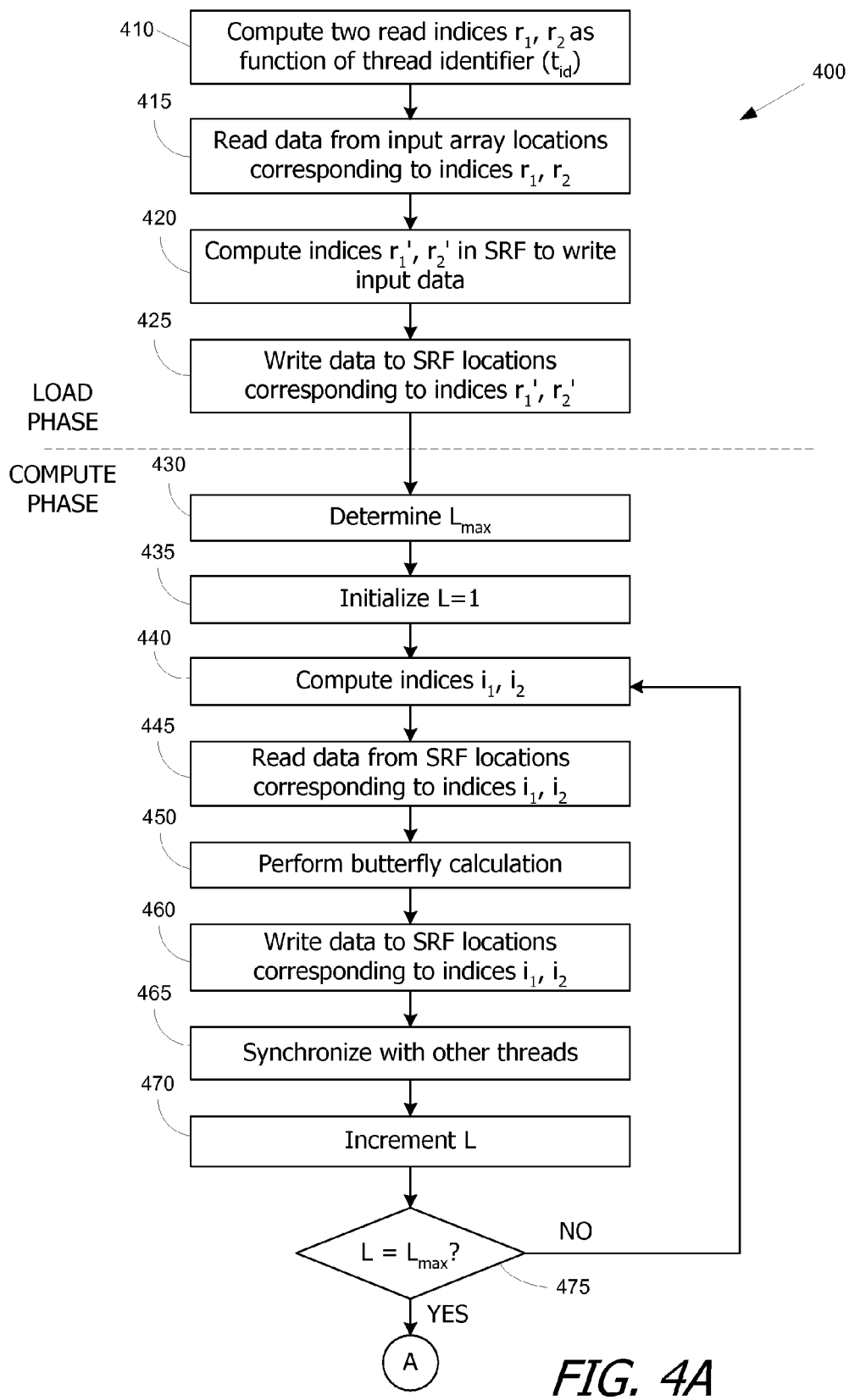
FIGS. 4A-4B are flow diagrams of a process for executing a radix-2 FFT that may be implemented in a CTA program according to an embodiment of the present invention.
Figure 4B:
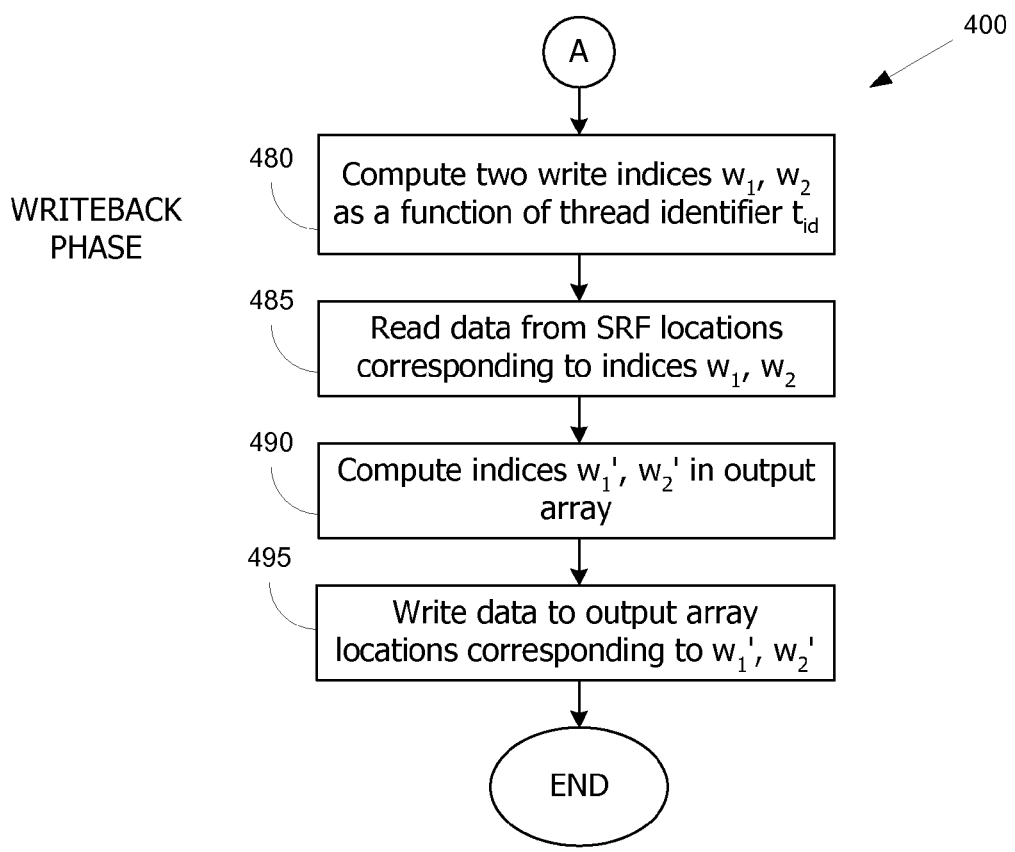

FIGS. 4A-4B are flow diagrams of a process 400 for executing an FFT that may be implemented in a CTA program according to an embodiment of the present invention. Process 400 may be executed by each thread of a CTA executing on a core 210 (FIG. 2) of PPU 122 (FIG. 1) or by CTA threads executing on other hardware platforms.

Process 400 begins with a "load" phase in which each thread reads a subset of the input data from global memory 220 into the CTA's shared memory (e.g., shared register file 206). At step 410, each thread computes two read indices ($r_1$ and $r_2$) identifying locations in the input array based on the unique thread identifier ($t_{id}$) assigned to that thread. At step 415, the thread reads data from the input array at locations corresponding to indices $r_1$ and $r_2$. At step 420, two indices ($r_1'$ and $r_2'$) are computed to determine where the data read from the input array will be stored in shared register file (SRF) 206. In some embodiments, indices $r_1'$ and $r_2'$ are equal to $r_1$ and $r_2$; in other embodiments, they are different. For instance, $r_1'$ and $r_2'$ might be bit-reversed and/or shifted relative to $r_1$ and $r_2$ as described below. At step 425, the data read at step 415 is written to locations in SRF 206 corresponding to indices $r_1'$ and $r_2'$. Each thread of the CTA advantageously loads two different data points into SRF 206 so that the entire input data set is loaded into SRF 206 during the load phase.

Next, process 400 enters a "compute" phase. Intermediate results generated during the compute phase are advantageously written to the CTA's shared memory (e.g., SRF 206), rather than to global memory 220. At step 430, a number ($L_{max}$) of transform levels (or stages) needed to complete an FFT on the N-point input data set is determined. In one embodiment of the present invention, $L_{max}$ may be either computed by the CTA program or read from state information supplied to the CTA program by the driver. As is known in the art, $L_{max}$ for an N-point radix-2 FFT is $\log_2 N$.

Process 400 loops over the transform levels, performing a butterfly computation at each level. At step 435, a current transform level (L) is initialized to 0. At step 440, each thread computes two indices ($i_1$ and $i_2$) identifying locations in SRF 206 from which data will be read. The indices $i_1$ and $i_2$ are based in part on the thread's unique thread identifier $t_{id}$ and in part on the current transform level L. In one embodiment of the present invention, the first index $i_1$ is determined based on thread identifier $t_{id}$ and the current transform level L, and the second index $i_2$ is determined from the first index by adding a level-dependent "stride," e.g., $2^L$. For instance, the first index $i_1$ and the second index $i_2$ can be computed as:

$$z=(t_{id}>>L)<<L,$$

$$i_1=(z<<1)+(t_{id}-z); \quad \text{(Eq. 2)}$$

and $$i_2=i_1+2^L, \quad \text{(Eq. 3)}$$

respectively. Here, the notation x>>y represents a bit shift of x to the right by y bits, and the notation x<<y represents bit shift of x to the left by y bits.

At step 445, data values ($a_{i1}$ and $a_{i2}$) are read from locations in SRF 206 identified by indices $i_1$ and $i_2$. At step 450, a butterfly calculation (see Eq. 1 above) is performed on these two values. At step 460, the resulting data values ($a'_{i1}$ and $a'_{i2}$) are stored in SRF 206 at locations corresponding to indices $i_1$ and $i_2$. At step 465, the threads synchronize with each other; each thread waits at step 465 until the other threads also reach this step. Barrier synchronization, as described in above-referenced application Ser. No. 11/305,178, or other synchronization techniques, may be used.

It should be noted that in an alternative embodiment, a thread might not write data back to the same two locations it read from; for instance, it may be desirable to permute the indices to optimize data access (as described below). Where a thread writes back to different locations, indices $i_1'$ and, $i_2'$ identifying writeback locations in SRF 206 can be computed before writing back data at step 260. In this embodiment, an additional synchronization step prior to writeback may be included to ensure that any data previously stored at the locations identified by indices $i_1'$ and, $i_2'$ has been read before it is overwritten.

At step 470, after the threads have synchronized, level index L is incremented. At step 475, each thread compares L to $L_{max}$. If L is less than $L_{max}$, process 400 returns to step 440. Once L becomes equal to $L_{max}$, the writeback phase is entered.

In the writeback phase, shown in FIG. 4B, final results (output data) are written to global memory 220. Similarly to the load phase described above, each thread advantageously write two points of the N-point output data set to global memory 220. More specifically, at step 480, two write indices ($w_1$ and $w_2$) identifying locations in SRF 206 are computed as a function of thread identifier ($t_{id}$). At step 485, the data is read from locations in SRF 206 corresponding to indices $w_1$ and $w_2$. At step 490, indices $w_1'$ and $w_2'$ identifying locations in the output array in global memory 220 are computed. At step 495, the output data read at step 485 is written to the output array at locations corresponding to indices $w_1'$ and $w_2'$. In some embodiments, $w_1=w_1'$ and $w_2=w_2'$; in other embodiments, such as when bit-reversal is implemented at the writeback phase, $w_1$ and $w_2$ are different from $w_1'$ and $w_2'$.

It will be appreciated that the FFT computation process described above is illustrative and other variations and modifications are possible. Steps described as sequential may be executed in parallel, order of steps may be varied, and steps may be modified or combined. For example, during the load phase, each thread might compute read indices $r_1$ and $r_2$ that correspond to the two data points on which that thread performs its first butterfly calculation. Where this is the case, steps 420 and 425 could be skipped, and steps 440 and 445 could be skipped during the first iteration of the compute-phase loop. In another example, each thread might write the last two values it computes to the output array (i.e., at the last iteration of the compute-phase loop, $i_1'=w_1$ and $i_2'=w_2$). Where this is the case, steps 455, 460, and 465 can be skipped during the last iteration of the compute-phase loop, and steps 480 and 485 in the writeback phase can be skipped.

In addition, in some embodiments, each thread performs more than one butterfly computation at each level; for instance, a thread might read and process two or four pairs of points per level. Where this is the case, the number of threads in the CTA would be correspondingly reduced.

In still other embodiments, the process described herein can be extended to radix-M FFTs for arbitrary integer M. (In practice, M is most often a small integer, e.g., less than 10, but this is not required.) In some embodiments, for a radix-M FFT, a CTA with a number (N/M) of threads is used to process the input data set. In one embodiment, at each transform level L, a thread with identifier $t_{id}$ computes a first index $i_1$ as:

$$z=(t_{id} \text{ div } D)*D,$$

$$i_1=(z*M)+(t_{id}-z); \quad \text{(Eq. 4)}$$

where $D=M^L$ and the "div" operator represents integer division. Each thread computes M−1 additional indices by applying a level-dependent stride (e.g., $M^L$), as is known in the art. Each thread then performs an M-way "butterfly" computation on a group of M data points identified by the indices; suitable M-way butterfly computations are known in the art. Mixed-radix FFTs and other related algorithms may also be supported.

Memory Use in FFT Process

Figure 5A:
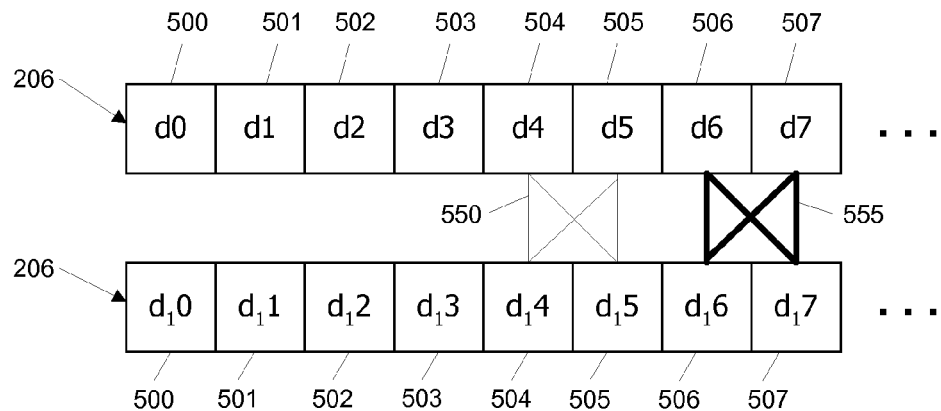
FIGS. 5A-5C illustrate use of a register file to store intermediate results during an FFT operation according to an embodiment of the present invention.
Figure 5B:
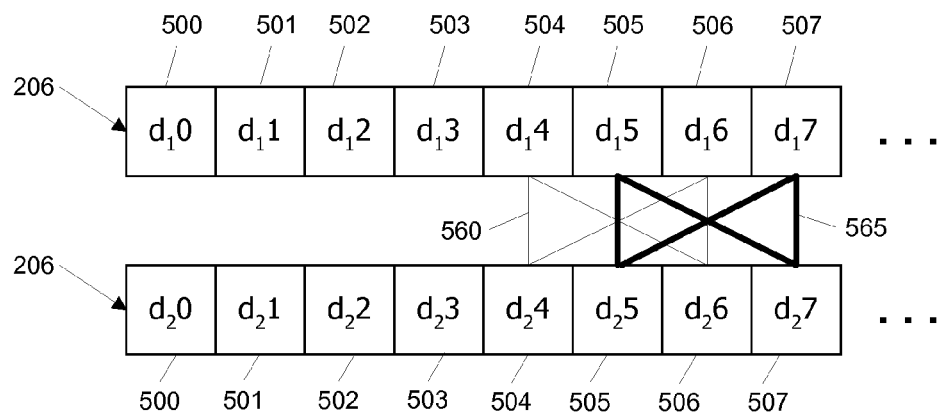
Figure 5C:
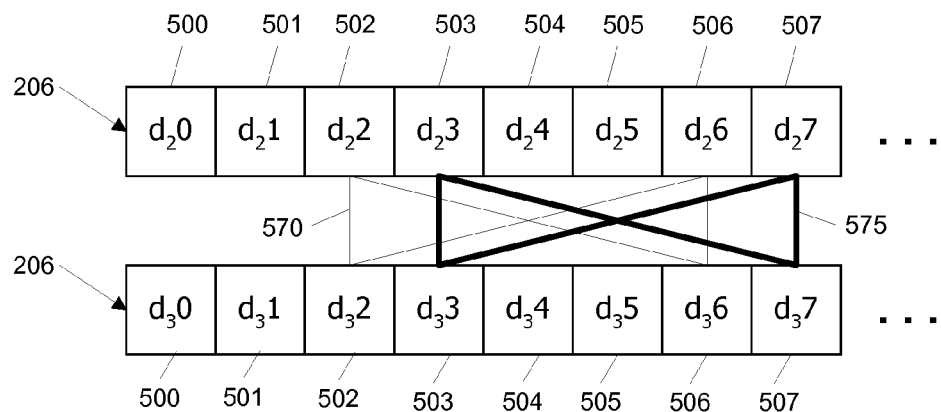

FIGS. 5A-5C illustrate use of SRF 206 to store intermediate FFT computation results during execution of process 400 (FIGS. 4A-4B) according to an embodiment of the present invention. FIG. 5A illustrates per-thread operations for a first transform level (L=0). Each thread of the CTA has loaded two data points into SRF 206 (step 425 of process 400). The first eight data values (d0-d7) of the input data set are shown in eight locations 500-507 in SRF 206. It is to be understood that SRF 206 may have more than eight entries and that the entire data set to be transformed by the CTA is advantageously loaded into SRF 206.

In a first iteration (level L=0) of the compute-phase loop of process 400, one thread computes indices $i_1$ and $i_2$ corresponding to locations 504, 505 in SRF 206 (step 440). That thread reads data values d4 and d5 from locations 504, 505 (step 445). The thread performs a butterfly calculation (step 450, represented in FIG. 5A by lines 550) on data values d4 and d5 to produce intermediate data values $d_14$ and $d_15$. The thread computes indices $i_1'$ and $i_2'$ corresponding to locations 504, 505 (step 455). (In this embodiment, $i_1'=i_1$, and $i_2'=i_2$, although this is not required.) The thread writes data values $d_14$ and $d_15$ to memory locations 504, 505, respectively (step 460). In parallel, another thread computes index locations $i_1$ and $i_2$ corresponding to SRF locations 506, 507; reads data values d6 and d7; performs a butterfly calculation (represented by lines 555) on data values d6 and d7 to produce intermediate data values $d_16$ and $d_17$; and writes the data values $d_16$ and $d_17$ back to locations 506, 507. In parallel, other threads (not explicitly shown) process the data value pairs d0, d1 and d2, d3. Assuming that the level counter L is found to be less than $L_{max}$ (step 470), L is incremented (step 475), and process 400 continues to a second transform level.

FIG. 5B illustrates per-thread operations for a second transform level (L=1). At this level, the stride ($2^L$) is 2. Thus, one thread computes indices $i_1$ and $i_2$ corresponding to SRF locations 504 and 506. That thread reads data values $d_1 4$ and $d_1 6$, performs a butterfly calculation (represented by lines 560), and writes the resulting data values $d_2 4$ and $d_2 6$ back to locations 504 and 506. In parallel, another thread computes index locations $i_1$ and $i_2$ corresponding to SRF locations 505, 507; reads data values $d_1 5$ and $d_1 7$; performs a butterfly calculation (represented by lines 565) on data values $d_1 5$ and $d_1 7$ to produce data values $d_2 5$ and $d_2 7$; and writes the data values $d_2 5$ and $d_1 7$ back to locations 505, 507. In parallel, other threads (not explicitly shown) process the data value pairs $d_1 0$, $d_1 2$ and $d_1 1$, $d_1 3$.

FIG. 5C illustrates per-thread operations for a third transform level (L=2). At this level, the stride ($2^L$) is 4. Thus, one thread computes indices $i_1$ and $i_2$ corresponding to SRF locations 502 and 506. That thread reads data values $d_2 2$ and $d_2 6$, performs a butterfly calculation (represented by lines 570), and writes the resulting data values $d_3 2$ and $d_3 6$ back to locations 502 and 506. In parallel, another thread computes index locations $i_1$ and $i_2$ corresponding to SRF locations 503, 507; reads data values $d_2 3$ and $d_2 7$; performs a butterfly calculation (represented by lines 575) on data values $d_2 3$ and $d_2 7$ to produce data values $d_3 3$ and $d_3 7$; and writes the data values $d_3 3$ and $d_3 7$ back to locations 503, 507. In parallel, other threads (not explicitly shown) process the data value pairs $d_2 0$, $d_2 4$ and $d_2 1$, $d_2 5$.

It should be noted that the same threads advantageously perform the butterfly calculations at each transform level. For instance, butterfly calculations 550, 560 and 570 may all be performed by a first thread ("thread A") while butterfly calculations 555, 565, 575 are all performed by a second thread ("thread B").

It should also be noted that at the second transform level (FIG. 2B), thread A consumes a data value ($d_1 6$) that was produced by thread B, and thread B consumes a data value ($d_1 5$) that was produced by thread A. Synchronization of the threads at the end of each transform level (step 465) advantageously guarantees that threads A and B will read the correct data values from SRF 206 at the next transform level. Apart from the synchronization step, different threads in the CTA are not required to execute corresponding instructions in any particular time relationship; for instance, thread A might complete its computation for a particular level and be waiting at step 465 before thread B even reads its data for that level.

It will be appreciated that the embodiment shown in FIGS. 5A-5C is illustrative and that variations and modifications are possible. For instance, while FIGS. 5A-5C illustrate thread behavior for a small number of threads and for the first three transform levels of an FFT, it is to be understood that the behavior illustrated herein may be extended to any number of threads and any number of transform levels that the system resources can support. In addition, the particular pairs of data values processed by each thread at a given level may be selected in any manner desired.

In general, each data point in an FFT is a complex value that can be represented as a real part and an imaginary part. In some embodiments, separate arrays for the real parts and imaginary parts of the data set are maintained in SRF 206, with real and imaginary parts of the same data point being stored in corresponding locations in the two arrays. To retrieve a data point, a thread computes an index (e.g., using Eq. 2 or Eq. 4 above) and uses that index as an offset to access the real array and the imaginary array in separate access operations. In other embodiments, real and imaginary parts are stored together at a single location and can be retrieved in a single access operation; the thread can separate real and imaginary parts to the extent doing so is useful in performing a butterfly computation.

FFT Using Multiple CTAs

Process 400 (FIG. 4) described above exploits a shared memory (e.g., shared register file 206), which is advantageously implemented as an on-chip, low-latency memory circuit, in order to reduce access time and execution time. Those skilled in the art will recognize that any memory device accessible to all the threads, including global memory 220, may be used to store intermediate results. In some embodiments, a shared cache might be used.

In principle, a CTA implementing an FFT algorithm might include any number of threads and might process any number of points. In practice, however, system resources—such as the size of the SRF, the number of threads that can be concurrently managed, and so on—limit the size of a CTA or the size of an input data set. For example, SRF 206 might be able to store no more than some number $N_{max}$ (e.g., 1024) of data points. In other embodiments, CTAs are limited to a system-dependent (or in some embodiments, application-dependent) maximum number ($T_{max}$) of threads. This in turn may limit the size of a data set that can be transformed using process 400, e.g., to $N=2*T_{max}$ points if each thread processes two points per transform level. In some cases, it may be desirable to perform an FFT on a larger input data set. In order to perform an FFT on such a data set, multiple CTAs may advantageously be used. Multiple cores 210 and/or multiple PPUs 122 can be used to execute multiple CTAs in parallel, or some or all of the CTAs can be executed sequentially if sufficient resources for fully parallel execution are not available.

Figure 6A:
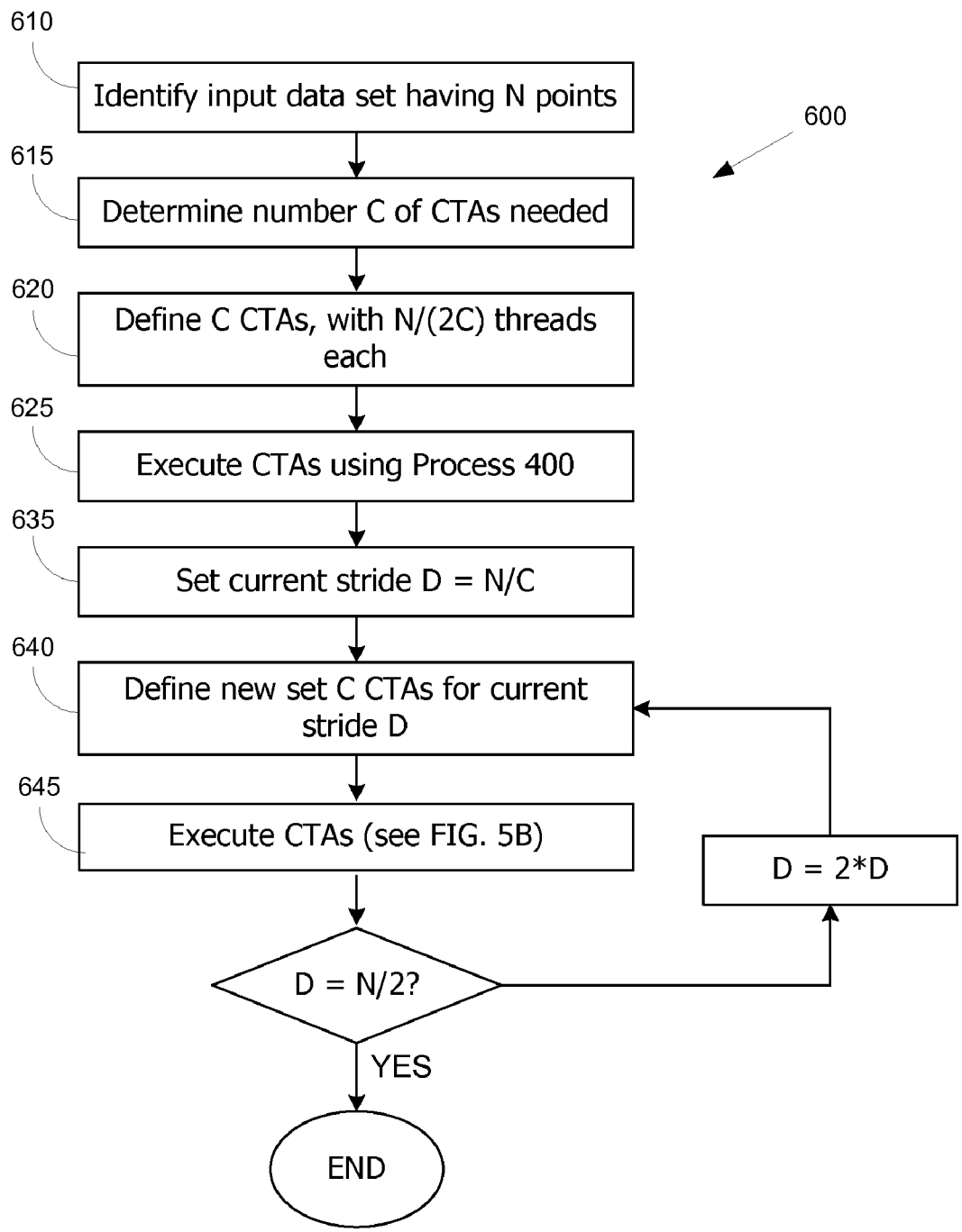
FIG. 6A is a flow diagram of a process for performing an FFT on an input data set using multiple CTAs according to an embodiment of the present invention.

FIG. 6A is a flowchart illustrating a process 600 for performing an FFT on an input data set using multiple CTAs according to an embodiment of the present invention. Process 600 can be implemented, e.g., in a driver program for PPU 122 (FIG. 1) that executes on CPU 102. Process 600 involves subdividing the input data set into a number C of subsets, independently transforming each subset using a CTA that executes process 400 of FIG. 4, and thereafter performing additional butterfly computations using additional groups of CTAs.

More specifically, at step 610, an N-point input data set is identified. In one embodiment, an application program executing on CPU 102 that invokes driver process 600 provides a pointer or other reference to an array in global memory 220. After the input data set is identified, the number C of CTAs needed to process subsets of the input data set is determined (step 615). In one embodiment, C is determined to be the smallest power of 2 that satisfies $N/(2C) \leq T_{max}$. (For example, if $T_{max}$ is 512 and N is 4096, then C=4.) With this choice, as many transform levels as possible are computed using the potentially faster process 400 described above. At step 620, a first set of C thread arrays is defined, with each CTA in the set having N/(2C) threads. Each thread in a CTA has a unique thread identifier ($t_{id}$), and each CTA has a unique CTA identifier ($c_{id}$).

At step 625, the C CTAs are executed using process 400 (FIGS. 4A-4B), as described above. In this embodiment, the N-point data set is stored in a single array in global memory 220, and during the load phase of process 400, read indices $r_1$, $r_2$ are computed as a function of CTA identifier $c_{id}$ as well as thread ID $t_{id}$ so that each CTA operates on a different portion of the input data set. Similarly, in the writeback phase, write indices $w_1'$ and $w_2'$ are computed based on both $c_{id}$ and $t_{id}$ so that each CTA writes its result data to a different portion of the output data array. As described above, in accordance with process 400, the threads of each CTA compute multiple transform levels L, up to a level ($L_{max}-1$) for which the corresponding stride $2^L$ is N/(2C). The CTAs may execute sequentially or in parallel (e.g., on multiple cores 210 and/or multiple PPUs 122), since data is not shared between threads of different CTAs. Process 600 advantageously waits while the CTAs execute. Upon completion, the CTAs write an output data set to an output array, advantageously located in global memory 220.

The output data produced by the C CTAs at step 625 is incompletely transformed. To complete the transform, additional CTAs that execute a different program are advantageously used. More specifically, at step 635, a current stride D is set equal to N/C, doubling the last stride used by the first set of CTAs. At step 640, a new set of C CTAs is defined. CTAs in the new set execute a program in which each thread reads two values (separated by the current stride D) from an array in global memory 220, performs a single butterfly calculation, and writes the result back to an array in global memory 220. An embodiment of a suitable CTA program is described below with reference to FIG. 6B.

At step 645, the new set of CTAs is executed. As noted above, the CTAs may execute sequentially or in parallel as desired. Process 600 advantageously waits for execution of the new set of CTAs to complete before proceeding.

At step 655, it is determined whether the current stride D is equal to N/2. If so, then the FFT is complete, and process 600 ends. If not, then at step 660, the stride D is doubled, and process 600 returns to step 640 to perform the next transform level using another new set of CTAs.

It will be appreciated that process 600 is illustrative and that variations and modifications are possible. Steps described as sequential may be executed in parallel, order of steps may be varied, and steps may be modified or combined. For example, process 600 could further include a "bit-reversing" step after the last set of CTAs executes so that the resulting data is in the correct order. Alternatively, bit reversal might be performed by the last set of CTAs when writing back their result data. In still other embodiments, threads in the first set of CTAs perform the bit reversal.

CTA Program for Single-Level FFT

Figure 6B:
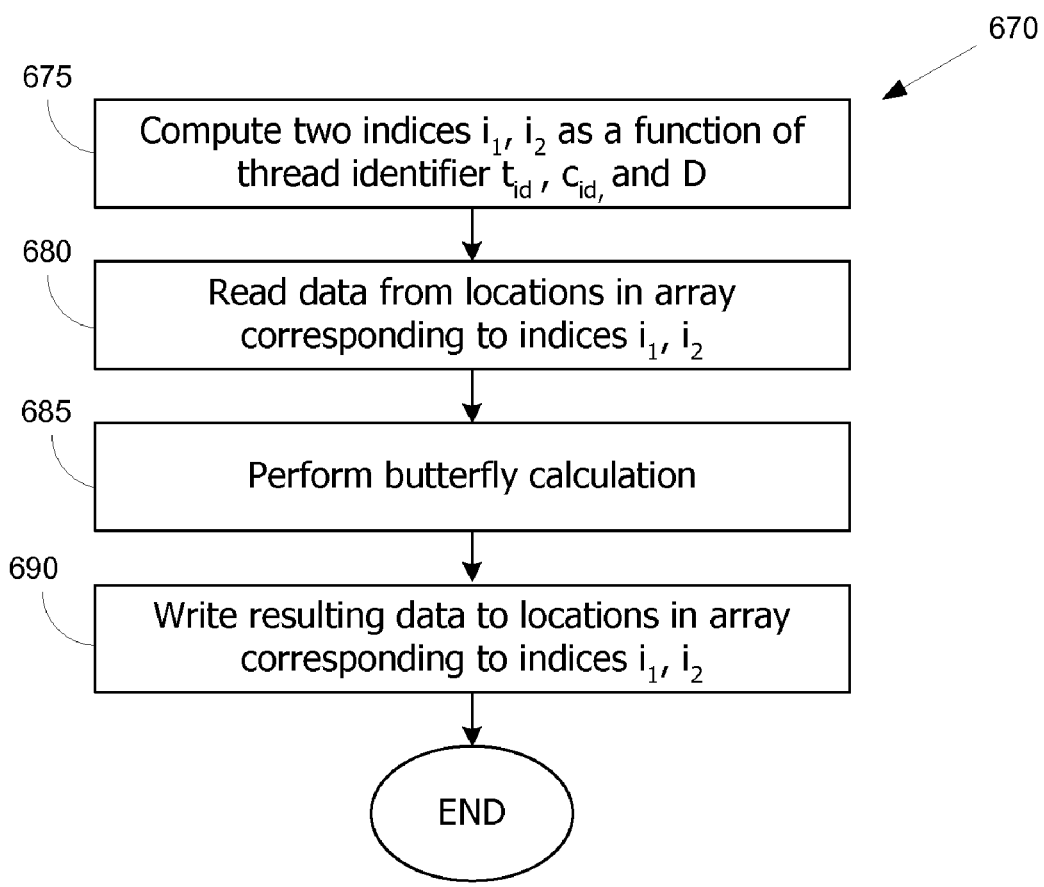
FIG. 6B is a flow diagram of a process for executing a stage of an FFT that may be implemented in a CTA program according to an embodiment of the present invention.

FIG. 6B is a flowchart illustrating a process 670 for executing a single transform level of an FFT that may be implemented in a CTA program according to an embodiment of the present invention. Process 670 is advantageously used as the CTA program for the CTAs defined at step 640 of process 600 (FIG. 6A). In process 670, each thread computes two indices corresponding to locations in an array that stores a current (intermediate) data set, reads the data values from those locations, performs a butterfly calculation, and writes the resulting data values back to the locations from which it read.

More specifically, at step 675, two indices $i_1$ and $i_2$ corresponding to locations in an array (e.g., in global memory 220) are computed as a function of thread identifier $t_{id}$, CTA identifier $c_{id}$, and the current stride D. A variation of Eqs. 2 and 3 may be used, with the thread identifier $t_{id}$ being replaced by a "global" thread identifier $t_g = c_{id} | t_{id}$, where operator "|" denotes bit-field concatenation. At step 680, two input data values are read from the array locations corresponding to indices $i_1$ and $i_2$. At step 685, a butterfly calculation (Eq. 1) is performed on these two input values. At step 690, the two resulting data values are written back to the same array locations from which the input data values were read. In an alternative embodiment, two arrays are used; the threads of a CTA read from one array and write to the other.

It should be noted that it is not necessary to synchronize the threads at any point in process 670, because no thread consumes data that is produced by another thread in the same CTA. Where process 670 is employed, synchronization is managed in a control process (e.g., process 600) that launches the CTAs. This process advantageously waits until all data needed by a particular CTA is available before launching that CTA.

It will be appreciated that process 670 is illustrative and that variations and modifications are possible. Steps described as sequential may be executed in parallel, order of steps may be varied, and steps may be modified or combined. In some embodiments, the thread may write back to locations other than the locations from which it read, in which case it may be desirable to synchronize threads in order to prevent a thread from overwriting data that has not yet been read. Further, a single thread may process multiple pairs of points. Process 670 may also be extended to a radix-M computation for arbitrary integer M.

Memory Use in Multiple-CTA FFTs

Figure 7A:
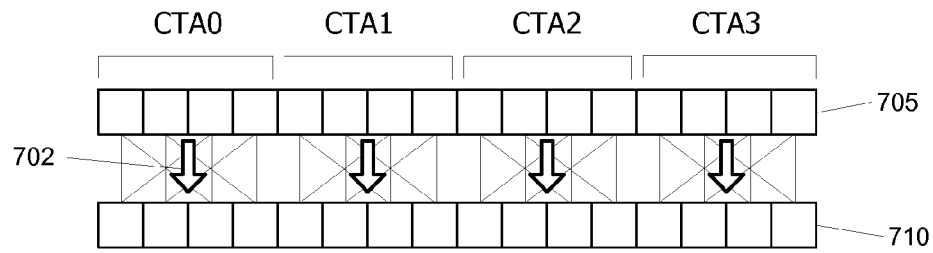
FIGS. 7A-7C illustrate a use of a memory to store intermediate results during an FFT operation using multiple CTAs according to an embodiment of the present invention.
Figure 7B:
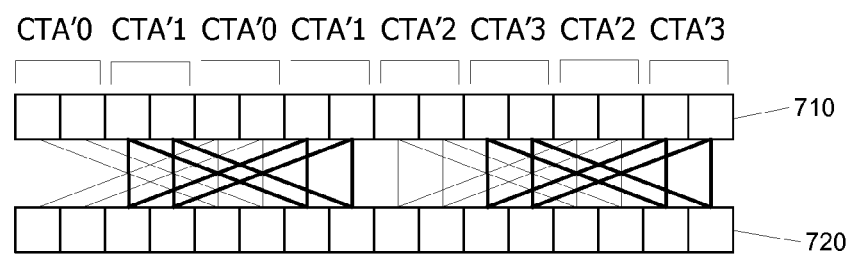
Figure 7C:
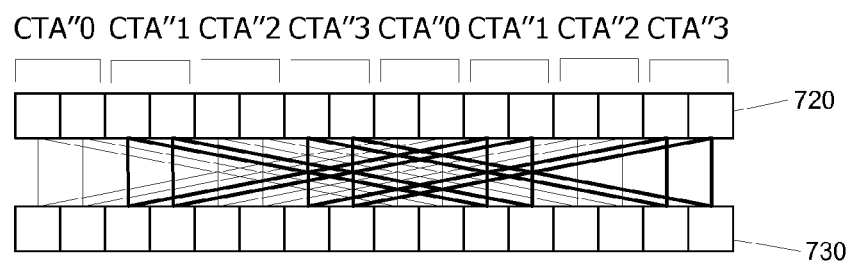

FIGS. 7A-7C illustrate the use of global memory 220 (e.g., system memory 104 or PP memory 124) to store data sets including input data, intermediate FFT computation results, and output data during execution of process 600 (FIG. 6A). FIG. 7A illustrates execution of the first set of CTAs at step 625 of process 600. An input data set is stored in an array 705 in global memory 220. In this example, it is to be understood that the input data set has a large number (e.g., 4096) of points; for simplicity, each block shown in array 705 represents multiple data points (e.g., 256 points). Four CTAs (CTA0-CTA3) are used to process the input data set, with each CTA processing a quarter of the total data set (e.g., 1024 points) as shown. Each CTA transforms its assigned portion of the input data set using multiple-level FFT process 400 (FIGS. 4A-4B), as indicated by arrows 702 in FIG. 7A, and writes the result data to an intermediate output array 710 in global memory 220. (In some embodiments array 710 overwrites input array 705.) The four CTAs may execute in parallel, e.g., on a PPU 122 with multiple cores 210, or sequentially on a single-core PPU 122.

FIG. 7B illustrates a first iteration of the processing loop (steps 640-660) of process 600 (FIG. 6A). In this iteration, the stride D is set to N/C (e.g., 1024 if N=4096 and C=4). A set of four new CTAs (CTA'0-CTA'3) is defined, with the threads in each CTA processing pairs of points in array 710 that are separated by stride D. CTAs CTA'0-CTA'3 are then executed using process 670 of FIG. 6B. As shown in FIGS. 7A and 7B, each thread of CTA'0 operates on one data point that was computed by CTA0 and one data point that was computed by CTA1; each thread of CTA'2 operates on one data point that was computed by CTA2 and one data point that was computed by CTA3; and so on. The resulting data is written to an intermediate output array 720 in global memory 220. (In some embodiments, intermediate output array 720 overwrites intermediate output array 710). The maximum stride (D=N/2) has not yet been reached, so D is doubled (e.g., to 2048), and process 600 performs a second iteration.

FIG. 7C illustrates the second iteration of the processing loop (steps 640-660) of process 600. In this iteration, the stride D is set to 2*N/C (e.g., 2048 if N=4096 and C=4). A set of four new CTAs (CTA"0-CTA"3) is defined, with the threads in each CTA processing pairs of points in array 710 that are separated by stride D. CTAs CTA"0-CTA"3 are then executed using process 670 of FIG. 6B. As shown in FIGS. 7B and 7C, each thread of CTA"0 operates on one data point that was computed by CTA'0 and one data point that was computed by CTA'2; each thread of CTA" 1 operates on one data point that was computed by CTA'1 and one data point that was computed by CTA'3; and so on. The resulting data is written to an output array 730 in global memory 220. (In some embodiments, output array 730 overwrites intermediate output array 720). At this point, the maximum stride (D=N/2) has been reached, and process 600 ends. The fully transformed data resides in output array 730.

It will be appreciated that the embodiment shown in FIGS. 7A-7C is illustrative and that variations and modifications are possible. For instance, while the input data set is shown as being processed by groups of four CTAs, any number of CTAs might be used. The particular numbers (4096, 1024, etc.) used herein are merely examples and are not limiting of the present invention.

Like the single-CTA FFT described above, the multiple-CTA FFT can be extended to arbitrary radix M; the extension follows principles similar to those described above for the single-CTA case.

It should be noted that FIGS. 7A-7C each represent one read access and one write access per CTA thread to global memory; however, while FIGS. 7B and 7C each represent one butterfly computation per thread, FIG. 7A represents any number of such computations. Thus, to the extent that data sharing via shared memory such as SRF 206 (as described above) is faster than access to global memory 220, it is advantageous to decompose the input data set in a way that maximizes the number of transform stages that can be accomplished using process 400; typically, this means decomposing a particular input data set into the smallest possible number of CTAs, given system constraints.

Bit Reversal

As is known in the art, some FFT algorithms produce output data in a permuted sequence in which the indices are "bit-reversed," i.e., the index of an output data point, expressed as a binary number, is a mirror image of the index bits for the output data point in the natural sequence. The FFT algorithms described above also exhibit bit reversal; accordingly, it is usually desirable to permute the data by bit-reversing the indices, either before the first set of butterfly computations (decimation in time) or after the last set of butterfly computations (decimation in frequency).

Conventionally, bit reversal is accomplished using a lookup table (LUT) that stores each possible index value for a given index size (e.g., 10-bit, 12-bit, etc.) in association with its bit-reversed counterpart. A table lookup operation is used to determine the bit-reversed index $i_{BR}$ for any given index $i_0$. The LUT may be relatively large (e.g., 1024 entries for a 10-bit index), but a table lookup is generally faster than performing bit reversal using bit manipulation operations.

In some embodiments, the present invention provides efficient bit-reversal techniques that may be used in connection with FFT algorithms implemented using CTAs. One such technique uses a small LUT in conjunction with bit shifting operations to generate a bit-reversed index.

Figure 8:
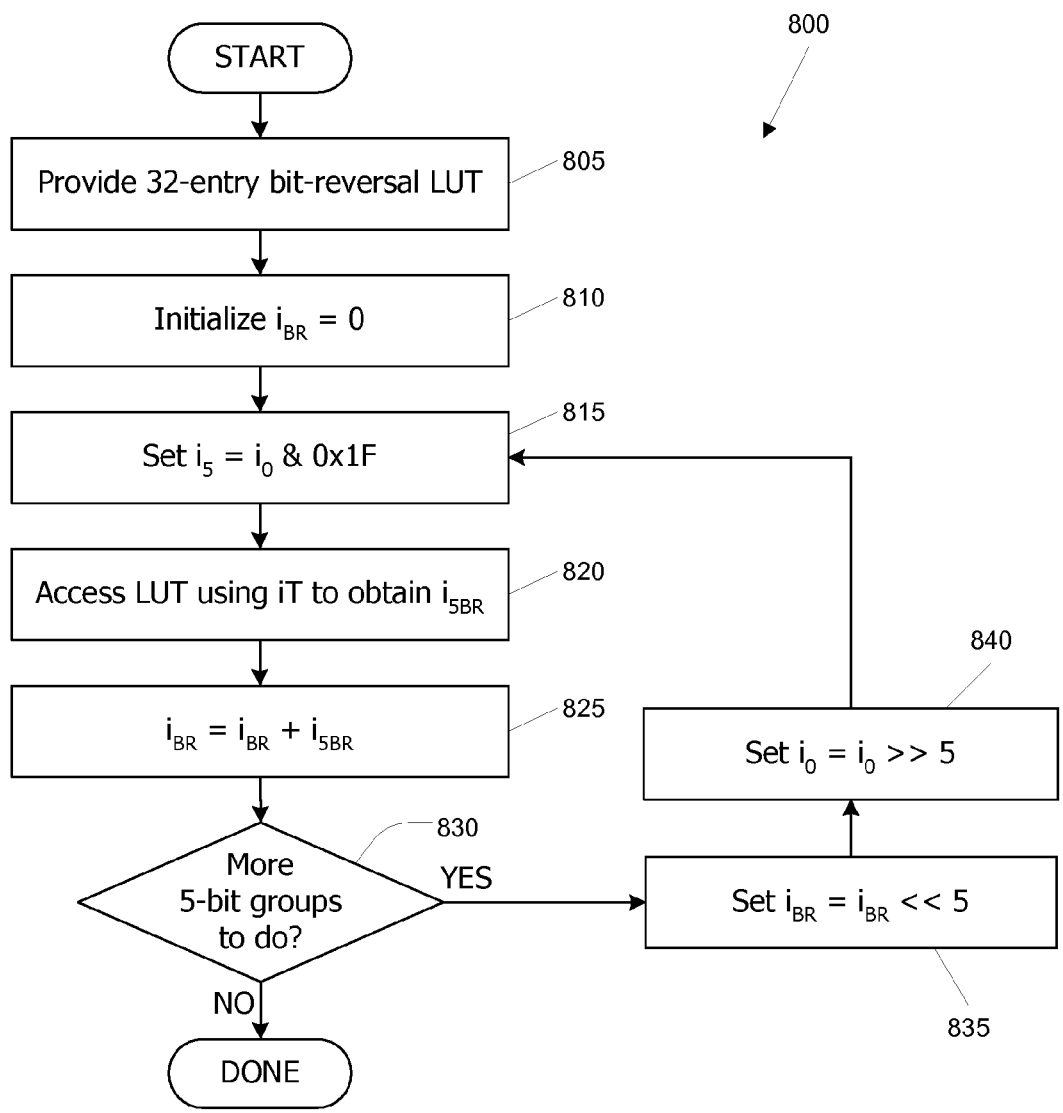
FIG. 8 is a flow diagram of a process for performing bit reversal in accordance with an embodiment of the present invention.

FIG. 8 is a flow diagram of a process 800 for bit-reversing an index $i_0$ according to an embodiment of the present invention. In process 800, it is assumed that the number of bits in index $i_0$ is a multiple of five and that indices are little-endian (i.e., numbered from the least significant bits (LSBs), so the LSBs are the rightmost bits). Starting with the five LSBs of the index $i_0$, each five-bit segment is bit reversed using a 32-entry lookup table; the bit-reversed index is built up by iterating over five-bit segments.

More specifically, at step 805, a 32-entry bit reversal LUT is provided. This LUT advantageously includes the bit reversed patterns for each possible five-bit index (00000, 00001, . . . , 11111). At step 810, a bit-reversed index $i_{BR}$ is initialized to zero. At step 815, the five LSBs of index $i_0$ are extracted as a five-bit segment $i_5$, e.g., by performing a logical AND operation between $i_0$ and hexadecimal 0x1F). At step 820, the LUT is accessed using segment $i_5$ to determine a bit-reversed segment $i_{5BR}$. At step 825, $i_{5BR}$ is added to $i_{BR}$. At step 830, it is determined whether index $i_0$ has any more five-bit segments to process. If so, then at step 835, $i_{BR}$ is left-shifted by five bits, and at step 840, $i_0$ is right-shifted by five bits. Process 800 then returns to step 815 to process the next five-bit segment. After all five-bit segments are finished at step 830, process 800 exits at step 850.

It will be appreciated that this bit-reversal process is illustrative and that variations and modifications are possible. Steps described as sequential may be executed in parallel, order of steps may be varied, and steps may be modified or combined. For instance, process 800 has been described on the assumption that the number of bits in the index $i_0$ is a multiple of five. Where this is not the case, additional steps may be performed. For instance, as an initialization step, index $i_0$ might be padded with zeroes in the most significant bits (MSBs) so that the number of bits is a multiple of five. After the bit reversal is completed, the bit-reversed index $i_{BR}$ can be right-shifted by the number of padding bits that were added. Alternatively, instead of using five-bit segments, other subdivisions (e.g., 4 bits, 6 bits, etc.) might be used.

Alternatively, in the case where $i_0$ is ten bits, the bit reversed index $i_{BR}$ can be expressed as:

$$i_{BR}=(LUT[i_0\& 0x1F]<<5)|LUT[i_0>>5], \quad (Eq. 5)$$

where LUT[ ] represents a table lookup operation in a 32-entry lookup table. This bit reversal can be accomplished in just five operations.

It should be noted that process 800 or Eq. 5 uses multiple accesses to a small LUT rather than a single access to a large LUT. In some CTA implementations, this arrangement is advantageous. For instance, since all threads of a CTA execute the same program and use the same lookup table, the LUT is advantageously stored in fast-access shared memory such as shared register file 206 (FIG. 2). A large LUT would consume space that might otherwise be used for storing intermediate result data, e.g., during execution of process 400 (FIG. 4) described above; a smaller LUT (such as the 32-entry LUT used in process 800) leaves more space available for intermediate result data. Further, where the LUT needs to be loaded into the shared memory during initialization of the CTA, using a smaller LUT allows faster initialization.

Although process 800 may be more time-consuming than using a single large LUT, the overall effect on performance will be negligible if bit-reversal is performed at a time when the threads would otherwise be idle. For instance, referring to FIG. 4A, there might be a significant latency associated with reading data from global memory 220 at step 415. The threads can perform bit reversal process 800 or a similar process while waiting for data to be returned. In a decimation-in-time FFT, the bit-reversed indices may be used as read indices $r_1'$, $r_2'$; in a decimation-in-frequency FFT, the bit-reversed indices computed by each thread may be stored (e.g., in local register file 204 of FIG. 2) for use during the writeback phase.

A variant of process 800 can be used where a decimation-in-time FFT is performed using multiple CTAs, e.g., as described above with reference to FIGS. 6A-6B and 7A-7C.

Where there are C CTAs, each CTA is advantageously assigned a unique CTA identifier $c_{id}$ in the range from 0 to C−1. The CTA with $c_{id}=0$ consumes the first 1/C of the data set, the CTA with $c_{id}=1$ consumes the second 1/C, etc., as shown in FIG. 7A. An index identifying data to be read by a particular thread is advantageously of the form $i_0=[c_{id}*(N/C)]+i(t_{id})$, where N/C is the number of data points per CTA, and $i(t_{id})$ denotes a thread-ID-dependent index. (In one embodiment, $i(t_{id})=t_{id}$ for a first read index and $i(t_{id})=t_{id}+N/(2C)$ for a second read index.) In other words, the $\log_2$ (N/C) MSBs hold the CTA identifier while the remaining bits are a thread-dependent index value that will be the same for corresponding threads in different CTAs.

The bit-reversed index $i_{BR}$ has the bit-reversed CTA identifier in the $\log_2$ (N/C) LSBs, and the bit-reversed $i(t_{id})$ in the remaining bits. In one embodiment, the bit-reversed CTA identifier (which is the same for all threads of the CTA) is supplied as a state parameter to the CTA. Process 800 described above is used to bit-reverse $i(t_{id})$ to produce $i_{BR}(t_{id})$. Thereafter, $i_{BR}(t_{id})$ is multiplied by (N/C), and the bit-reversed CTA identifier is added. In other words, the bit-reversed index $i_{0BR}$ is given by:

$$i_{0BR}=(N/C)*i_{BR}(t_{id})+c_{BR}, \quad (\text{Eq. 6})$$

where $i_{BR}(t_{id})$ is the bit-reversal of the thread-ID-dependent index $i(t_{id})$ and $c_{BR}$ is the bit-reversed CTA identifier. For example, in the embodiment shown in FIG. 7A, with N/C=4, the two-bit CTA identifiers 0-3 are bit-reversed to obtain $c_{BR}$ values of 0, 2, 3, and 1. The bit-reversed indices $i_{0BR}$ for the threads in the four CTAs that have identifier $t_{id}$ are $4i_{BR}(t_{id})$ (in CTA0), $4i_{BR}(t_{id})+2$ (in CTA1), $4i_{BR}(t_{id})+1$ (in CTA2), and $4i_{BR}(t_{id})+3$ (in CTA3).

In one embodiment, the bit-reversed indices generated by Eq. 6 are used by each thread of each CTA to identify the location in the input array from which it should read initial data. Alternatively, each thread can compute an initial read index using the bit-reversal lookup table process described above; using Eq. 6 may advantageously reduce the number of computations required.

Those skilled in the art will appreciate that the bit-reversal algorithm described herein could be generalized for base-M digit-reversal when performing FFTs for arbitrary radix M. Alternatively, radix-M FFTs can be performed using a self-sorting algorithm that permutes the data as part of the butterfly operation; examples of such algorithms are known in the art.

Efficient Access to Shared Register File

As noted above, threads of a CTA executing process 400 (FIGS. 4A-4B) advantageously use a shared memory (e.g., SRF 206) to store intermediate results. In some embodiments, if the butterfly computation is sufficiently fast, access to the shared memory can become a limiting factor in CTA performance. Accordingly, it is desirable to use the shared memory in a way that reduces access time to the extent practical. Examples of techniques for efficient shared-memory access will now be described.

FIG. 9A illustrates a shared memory 900 according to an embodiment of the present invention. Shared memory 900 as shown has 16 banks (columns) B0-B15, each of which has multiple entries. Some of the entries are shown as storing data values d0-d42. It is to be understood that shared memory 900 may have any number B of banks and each bank may have any number of entries. The banks are advantageously interleaved; i.e., consecutive addresses in shared memory 900 correspond to entries in different banks. For purposes of the present discussion, it is assumed that data values d0-d42 in FIG. 9A are stored at entries with addresses 0-42, respectively; those skilled in the art will recognize that other addressing schemes may be substituted.

Within each bank, only one entry can be accessed per cycle. Shared memory 900 advantageously includes independent per-bank address decoders, allowing different entries in different banks to be accessed in the same cycle. Thus, for instance, data values d0, d14, d34 and d24 might all be accessed in the same cycle, but data values d0 and d16 cannot be.

In some embodiments, multiple threads of a CTA may request access to shared memory 900 in parallel to perform a read or write function. For instance, where threads of a CTA are executed in SIMD groups (described above with reference to FIG. 2) of P threads each, P threads will issue memory access requests to shared memory 900 in parallel. Shared memory 900 can satisfy the P requests in parallel if each request targets a different one of banks B0-B15 or, in some embodiments, if all requests target the same address. Where two or more requests received in parallel target different addresses in the same bank (a condition referred to herein as a "bank conflict"), shared memory 900 handles those requests serially. In the case of SIMD-group execution, serialization can slow throughput considerably, as none of the threads in the SIMD group will proceed until all memory requests for the group have been completed. Thus, it is desirable to maximize the likelihood that requests from different threads of a SIMD group can be satisfied in parallel.

For FFT operations, the data storage pattern shown in FIG. 9A is relatively inefficient. For instance, consider bit-reversal in a decimation-in-time FFT. Suppose that a CTA is performing a 1024-point FFT (10-bit index) and that each SIMD group consists of 16 threads. In one embodiment, the threads in a SIMD group advantageously read contiguous locations from the input data array in global memory 220; for instance, at step 415 of process 400, one group of 16 threads might read the data values with indices $r_1=0, 1, \ldots, 15$. Upon bit-reversal, these indices convert to indices $(r_1')$ of 0, 128, 64, 192, etc. All of these indices $r'_1$, treated as addresses in shared memory 900, correspond to different locations in bank B0. This is a bank conflict, and 16 serialized write operations would be needed to write the data.

In accordance with an embodiment of the present invention, instead of storing the data at an address given by the bit-reversed index $i_{BR}$, the bit-reversed index is modified to an address A by adding a skew amount based on the bit-reversed index and the number of banks:

$$A=i_{BR}+[i_{BR}/B], \quad (\text{Eq. 7})$$

where B is the number of banks in the shared memory (B=16 for shared memory 900 as shown in FIG. 9A), and the notation $[i_{BR}/B]$ represents integer division (any remainder is discarded). Thus, instead of writing to addresses 0, 128, 64, 192, etc., the first SIMD group writes to addresses 0 (bank B0), 136 (bank B8), 68 (bank B4), 204 (bank B12), etc.

FIG. 9B illustrates a pattern for storing data in shared memory 900 that results from application of Eq. 7. Certain entries in memory 900 (marked with X) are not used. All of the data is still present, but the locations have been selected in a way that reduces, or in some instances eliminates, the occurrence of bank conflicts while writing of data into shared memory 900.

In some embodiments, the threads of a CTA maintain the pattern shown in FIG. 9B throughout the execution of process 400. At each stage, the thread computes an index (an identifier of an element of the initial, intermediate, or final data set), then converts that index to an address using Eq. 7. This procedure advantageously reduces the occurrence of bank conflicts at intermediate stages of process 400, resulting in shorter execution time.

For example, in the radix-2 FFT, at one of the transform levels, the threads in a SIMD group might be accessing 16 data points with consecutive even-numbered indices (e.g., d0, d2, d4, ... d30) in parallel. For the data storage pattern of FIG. 9A, bank conflicts occur since at most eight of these data points can be accessed in parallel. With the storage pattern of FIG. 9B, all 16 of these data points can be accessed in parallel. In some instances, this procedure will not eliminate bank conflicts altogether; however, the occurrence of bank conflicts can be reduced.

It will be appreciated that the embodiment shown in FIGS. 9A-9B is illustrative and variations and modifications are possible. For example, memory 900 could have any size desired and any number of banks B. For optimum performance, B is advantageously at least as large as the number of parallel requests expected. Further, a fast-access shared memory can be implemented in any manner desired. In some embodiments, bank conflicts might not exist or might not affect performance.

It should also be noted that the small bit-reversal LUT described above may advantageously be stored in memory 900. For example, a bit-reversal LUT for 5-bit segments contains 32 entries and can be loaded into the first two rows of memory 900. If consecutive indices assigned to the threads in a SIMD group of 16 (or fewer) threads, the threads will access different entries in the LUT, allowing the lookup operations for all threads in the group to be performed in parallel.

Higher-Dimensional FFTs

In some embodiments, CTAs are used to perform FFTs on multidimensional data sets. As is known in the art, a two-dimensional (2-D) FFT can be performed in a 2-D array of data samples by transforming each row of the array, then transforming each column of the row-transformed array. The same concept can be extended to three-dimensional (3-D) FFTs and to higher dimensions as well.

In one embodiment of the present invention, a 2-D FFT for a data set of size $N_0*N_1$ is executed by using a first group of CTAs to transform the rows, then using a second group of CTAs to transform the columns. Depending on the size of each row and the system-dependent limits on the number of data points or threads per CTA, one or more CTAs might be used per row. Similarly, one or more CTAs might be used per column, and it is not required that equal numbers of CTAs be used for row and column transformations.

FFTs of higher dimensions (e.g., 3-D) can be implemented by factoring the signal into a series of 1-D transforms. For instance, a 3-D data set can be factored into three 2-D data sets, and the transform can proceed along the rows, then the columns of one 2-D data set at a time.

Those skilled in the art will appreciate that the transforms along the rows and columns of a matrix can be accomplished by performing the first set of transforms along the rows (using Eqs. 2 and 3 above to compute the indices), then transposing the resulting (intermediate) matrix and performing transforms along the rows of the transposed matrix. Alternatively, through appropriate computations of index offsets and strides, a transform can proceed down the columns of the matrix, avoiding the need to transpose the matrix.

It will be appreciated that higher-dimensional FFTs can be handled in various ways. For instance, the dimensions may be handled in any order, and the optimum approach may be based in part on the manner in which multidimensional arrays are stored in memory (e.g., row-major vs. column-major).

CTAs may use global memory 220 and/or shared memory such as SRF 206 to store temporary results generated during their execution, as described above.

Application Program Interface In some embodiments, FFT functionality is implemented in CTAs that are executed by PPU 122 (FIG. 1). In other embodiments, the CTAs may be executed by CPU 102 or any other co-processor. In any case, the FFT functionality can advantageously be invoked under the direction of an application program executing on CPU 102. As is known in the art, communication between CPU 102 and PPU 122 can be managed by a driver program that executes on CPU 102. The driver program supports an application program interface (API) that defines function calls supported by PPU 122, and an application programmer can invoke the GPU functions by including suitable function calls from the API at appropriate places in the application program code.

In accordance with an embodiment of the present invention, the API for a driver program for PPU 122 supports a library of general-purpose computation functions that can be invoked by application programs. This library includes one or more functions that perform FFTs using CTAs. For example, process 300 of FIG. 3 or process 400 of FIG. 4A may be executed in response to a function call. In one embodiment, the function call for an FFT function requires the programmer to specify, e.g., a location in global memory 220 where the input data set is stored and the number of points N of the input data set. In other embodiments, the function call might allow the application to specify other parameters, such as a desired radix (M) for the FFT computation, dimensionality of the input data set, or the like.

The particular details of the API, such as names and parameters of particular function calls, are a matter of design choice, and persons of ordinary skill in the art with access to the present teachings will be able to create suitable APIs for a given hardware implementation.

In response to the API function call, the driver initiates execution of one or more CTAs to perform an FFT on the input data set. The manner in which the CTAs are executed (and even the fact that CTAs are being used) may be hidden from the application program. In particular, the application program is not required to know details of how the processing hardware executes a CTA, such as which processor executes the CTAs, whether there is SIMD parallelism, the number of threads in a SIMD group, any factors limiting the size of a CTA, and so on.

Further Embodiments

While the invention has been described with respect to specific embodiments, one skilled in the art will recognize that numerous modifications are possible. In general, a CTA may be made as large as desired provided that any potential data sharing among the threads can be supported.

Embodiments described above with reference to radix-2 FFTs can be extended to radix-M FFT computations on an input data set, where M is an integer greater than or equal to 2. In some embodiments, for a radix-M FFT, a CTA with a number (N/M) of threads is used to process the input data set. Each thread performs an M-way "butterfly" on a group of M data points at each level, and the stride between data points is $M^{L-1}$. Thus, as used herein, the term "butterfly" should be understood as referring generally to a linear combination of two or more data points, with some or all of the data points being multiplied by appropriate coefficients for a particular FFT algorithm. Mixed-radix FFTs and other related algorithms may also be supported. For instance, in a 2-D FFT, one dimension might be transformed using radix-2 while the other is transformed using radix-3.

Those skilled in the art will appreciate that the techniques described herein can also be adapted to compute transforms other than FFTs. Numerous well-known transform algorithms involve a basic butterfly computation of the form:

$$a_{i1}' = V_k a_{i1} + W_k a_{i2}$$

$$a_{i2}' = V_k a_{i1} - W_k a_{i2} \quad \text{(Eq. 8)}$$

where the weights $V_k$, $W_k$ are determined based on indices $i_1$ and $i_2$ (and in some cases other information as well). Examples of such transforms include Discrete Cosine Transforms, Hadamard transforms, wavelet transforms, and the like. The butterfly computation may be performed in a single pass (e.g., in the Hadamard transform) or iteratively.

Embodiments described herein may make reference to all threads of a CTA being executed concurrently. As used herein, "concurrently" means that at least a portion of the execution of each thread overlaps in time with a portion of the execution of another thread; it is not required that all threads (or even any two threads) begin or end their execution at the same time. In some embodiments, concurrent threads of a CTA may be executed in parallel to reduce the CTA execution time, and multiple CTAs may be executed in parallel to reduce the execution time of a multi-CTA workload.

CTAs can be executed on parallel processors, multi-threaded processors, vector processors, or any other processor capable of exploiting the explicit parallelism made available by the concurrent threads of the CTA and the parallelism made available by concurrent execution of multiple CTAs. CTAs can also be executed on sequential processors such as conventional CPUs by exploiting software techniques such as thread scheduling, although performance in such systems might not be as high as in systems that can leverage CTA parallelism. It is to be understood that although an example parallel processor architecture is described herein, the present invention is not limited to any particular hardware platform.

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

While the present invention has been described with reference to specific hardware and software components, those skilled in the art will appreciate that different combinations of hardware and/or software components may also be used, and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A method for transferring a data set having a plurality of data points from a first memory to a second memory, the method comprising:

providing a data set in a first memory, the data set including a plurality of data points, each data point having a unique index associated therewith;

identifying a second memory having a plurality of banks, each bank having a plurality of locations, wherein locations in different ones of the plurality of banks are accessible in parallel;

reading at least two of the data points of the data set from the first memory;

bit-reversing the respective indices associated with each of the at least two data points to obtain at least two bit-reversed indices, wherein the bit-reversed indices for the at least two data points correspond to destination locations in the same one of the plurality of banks in the second memory;

modifying the at least two bit-reversed indices such that the respective destination locations corresponding to different ones of the at least two modified bit-reversed indices are in different ones of the banks; and writing, in parallel, the at least two data points to the second memory at respective destination locations corresponding to the modified bit-reversed indices.

2. The method of claim 1 wherein the act of modifying includes:

computing a skew amount based on the bit-reversed index and the number of banks in the second memory; and adding the skew amount to the bit-reversed index.

3. The method of claim 2 wherein the skew amount is equal to the bit-reversed index divided by the number of banks.

4. The method of claim 1 wherein:

during the act of reading, the at least two data points are read in parallel;

during the act of bit-reversing, the indices associated with the at least two data points are bit-reversed in parallel; and during the act of modifying, the at least two bit-reversed indices are modified in parallel.

5. The method of claim 1 wherein the act of bit-reversing is performed during a latency period associated with the act of reading.

6. The method of claim 1 wherein the act of identifying the second memory further includes identifying, as the second memory, a shared memory area accessible only to a plurality of threads in a thread array configured to process the data set.

7. The method of claim 1 further comprising:

repeating the acts of reading, bit-reversing, modifying, and writing for a plurality of groupings of at least two points from the data set until the entire data set is stored in the second memory; and performing a Fast Fourier Transform (FFT) on the data set stored in the second memory to produce an output data set.

8. The method of claim 7 further comprising:

transferring the output data set from the second memory to the first memory.

9. The method of claim 8 wherein the act of transferring includes overwriting the data set provided in the first memory with the output data set.

10. The method of claim 1 wherein the act of bit-reversing each of the at least two indices includes:

providing a lookup table having a number of entries that is less than a number of data points in the data set, wherein each entry in the lookup table associates a bit segment having a number b of bits with a bit-reversed counterpart of the b-bit segment;

extracting from each of the at least two indices a first b-bit segment consisting of the b least significant bits of the index; and performing at least two lookup operations on the lookup table, each lookup operation using a respective one of the first b-bit segments and returning a corresponding first bit-reversed segment, wherein the at least two lookup operations are performed in parallel.

11. The method of claim 10 wherein the act of bit-reversing for each of the indices further includes:

extracting from each of the at least two indices a second b-bit segment;

performing at least two further lookup operations on the lookup table, each of the further lookup operations using a respective one of the second b-bit segments and returning a corresponding second bit-reversed segment, wherein the at least two further lookup operations are performed in parallel; and appending each second bit-reversed segment to a corresponding one of the first bit-reversed segments.

12. A method for transferring an input data set from a first memory to a second memory, the method comprising:

defining a thread array having a plurality of threads, each thread configured to execute a same program on an input data set to produce an output data set, each thread having a unique thread identifier assigned thereto;

grouping the threads of the thread array into one or more thread groups, wherein threads in each thread group are to be executed in parallel;

identifying a second memory having a plurality of banks, each bank having a plurality of locations, wherein locations in different ones of the plurality of banks are accessible in parallel;

executing the threads of each thread group in parallel, wherein executing the threads of each thread group includes, for each thread in the thread group:

determining, based at least in part on the unique thread identifier, an index identifying a data point of the input data set;

reading the identified data point from the first memory;

bit-reversing the index, wherein respective bit-reversed indices computed for a first thread and a second thread of the thread group correspond to locations in the same one of the plurality of banks in the second memory;

modifying the bit-reversed index such that the respective modified bit reversed indices for the first thread and the second thread correspond to locations in different ones of the banks; and writing the read data point to the second memory at a location corresponding to the modified bit-reversed index, wherein respective data points read by the first thread and the second thread are written in parallel.

13. The method of claim 12 wherein the input data set is to be transformed using a Fast Fourier Transform (FFT) and wherein execution of the threads in each thread group further includes, for each thread in the thread group:

reading at least two data points from the second memory, wherein the at least two data points are selected based in part on the thread identifier assigned to the thread;

performing a butterfly calculation on the at least two data points to produce at least two modified data points; and writing the at least two modified data points to the second memory.

14. The method of claim 13 wherein during the act of writing, the at least two modified data points overwrite the at least two data points that were read during the act of reading.

15. The method of claim 12 wherein the act of bit-reversing the index for each thread in the thread group includes:

providing a lookup table having a number of entries that is less than a number of data points in the data set, wherein each entry in the lookup table associates a bit segment having a number b of bits with a bit-reversed counterpart of the b-bit segment;

extracting from the index a first b-bit segment consisting of the b least significant bits of the index; and performing a lookup operation on the lookup table, the lookup operation using the first b-bit segment and returning a corresponding first bit-reversed segment, wherein the lookup operations for the threads in the thread group are performed in parallel.

16. The method of claim 15 wherein the act of bit-reversing the index for each thread in the thread group further includes:

extracting from the index a second b-bit segment;

performing a further lookup operation on the lookup table, the further lookup operation using the second b-bit segment and returning a corresponding second bit-reversed segment, wherein the further lookup operations for the threads in the group are performed in parallel; and appending the second bit-reversed segment to the first bit-reversed segment.

17. The method of claim 15 wherein the act of bit-reversing the index for each thread in the thread group further includes:

determining a thread array identifier usable by all threads of the thread array; and determining a bit-reversed thread array identifier, wherein the bit-reversed index is formed based in part on the first bit reversed segment and in part on the thread array identifier.

* * * * *